(12) United States Patent
Chen et al.

(10) Patent No.: US 11,518,721 B2
(45) Date of Patent: Dec. 6, 2022

(54) *CHLORELLA* COMPOSITIONS AND METHODS OF USE THEREOF TO ENHANCE PLANT GROWTH

(71) Applicant: HELIAE DEVELOPMENT, LLC, Gilbert, AZ (US)

(72) Inventors: Chiliang Chen, Gilbert, AZ (US); Edgard Jauregui, Casa Grande, AZ (US); Alexander Sitek, Mesa, AZ (US); Stephen Ventre, Mesa, AZ (US); Karl Wyant, Tempe, AZ (US)

(73) Assignee: HELIAE DEVELOPMENT, LLC, Gilbert, AZ (US)

( * ) Notice: Subject to any disclaimer, the term of this patent is extended or adjusted under 35 U.S.C. 154(b) by 0 days.

(21) Appl. No.: 17/387,970

(22) Filed: Jul. 28, 2021

(65) Prior Publication Data

US 2021/0380499 A1 Dec. 9, 2021

Related U.S. Application Data

(63) Continuation-in-part of application No. PCT/US2021/036669, filed on Jun. 9, 2021.

(60) Provisional application No. 63/148,106, filed on Feb. 10, 2021, provisional application No. 63/056,203, filed on Jul. 24, 2020, provisional application No. 63/036,839, filed on Jun. 9, 2020.

(51) Int. Cl.
*C05F 11/00* (2006.01)
*C05F 11/08* (2006.01)

(52) U.S. Cl.
CPC .............. *C05F 11/00* (2013.01); *C05F 11/08* (2013.01)

(58) Field of Classification Search
None
See application file for complete search history.

(56) References Cited

U.S. PATENT DOCUMENTS

| 10,517,303 | B2 * | 12/2019 | Shinde | C12N 1/12 |
|---|---|---|---|---|
| 10,869,484 | B2 * | 12/2020 | Shinde | A01N 63/00 |
| 11,197,474 | B2 * | 12/2021 | Shinde | A01H 5/10 |
| 2016/0021923 | A1 * | 1/2016 | Paulsen | A23L 29/206 |
|  |  |  |  | 426/577 |
| 2016/0165895 | A1 * | 6/2016 | Shinde | A01N 65/03 |
|  |  |  |  | 504/117 |
| 2016/0165896 | A1 * | 6/2016 | Shinde | A01N 65/03 |
|  |  |  |  | 504/117 |
| 2016/0165897 | A1 * | 6/2016 | Shinde | A01G 33/00 |
|  |  |  |  | 504/117 |
| 2017/0367351 | A1 * | 12/2017 | Shinde | A01N 63/00 |
| 2018/0223246 | A1 * | 8/2018 | Shinde | A01N 65/03 |
| 2019/0008157 | A1 * | 1/2019 | Shinde | A01N 65/03 |
| 2019/0112528 | A1 * | 4/2019 | Huang | A01N 65/03 |

(Continued)

*Primary Examiner* — Wayne A Langel
(74) *Attorney, Agent, or Firm* — Timothy Marc Shropshire

(57) ABSTRACT

The present invention provides a mixture comprising: a) a first liquid composition comprising a culture of microalgae, the microalgae comprising whole pasteurized *Chlorella* cells; and b) a second liquid composition comprising a culture of microalgae, the microalgae comprising lysed pasteurized *Chlorella* cells; wherein a combination of the first liquid composition and the second liquid composition exhibits synergy. Also provided is a method of treating a plant, a plant part, or the locus surrounding the plant to enhance plant growth, the method comprising applying an effective amount of the mixture.

11 Claims, 15 Drawing Sheets

(56) References Cited

U.S. PATENT DOCUMENTS

| | | | |
|---|---|---|---|
| 2019/0142014 A1* | 5/2019 | Carney | A01G 22/05 |
| | | | 47/58.1 FV |
| 2019/0174765 A1* | 6/2019 | Carney | A01N 65/03 |
| 2020/0060283 A1* | 2/2020 | Shinde | A01N 63/00 |
| 2021/0329927 A1* | 10/2021 | Shinde | A01N 65/03 |
| 2022/0142178 A1* | 5/2022 | Jauregui | A01N 65/03 |

* cited by examiner

CHLORELLA COMPOSITIONS AND METHODS OF USE THEREOF TO ENHANCE PLANT GROWTH

CROSS REFERENCE TO RELATED APPLICATIONS

This application is a Continuation-in-Part of International Patent Application No. PCT/US2021/036669, filed on Jun. 9, 2021, which claims the benefit of and priority to U.S. Provisional Patent Application No. 63/036,839, filed on Jun. 9, 2020; U.S. Provisional Patent Application No. 63/056,203, filed on Jul. 24, 2020; and U.S. Provisional Patent Application No. 63/148,106, filed on Feb. 10, 2021; the contents of each of which are incorporated herein by reference in their entireties.

TECHNICAL FIELD

The present invention relates generally to methods and compositions for stimulating and maintaining enhanced growth in plants. More particularly, the present invention relates to liquid compositions comprising *Chlorella* cells that demonstrate plant growth enhancement activity.

BACKGROUND

It is a common practice in the agricultural field both for food production, ornamental shrubs and trees, and lawn grasses to accelerate growth by the application of chemical fertilizers, e.g., nitrates, phosphates, and potassium compounds, and also chemical materials such as pesticides, herbicides, and fungicides, etc., that can be toxic. Further, it is a present practice to overload the crops with these chemical materials and to repeatedly treat most crops multiple times in a growing season (typically four times, may be as many as eight times depending on the pant and location) because these water-soluble substances would wash off. The significant amount of runoff means that users must use more of these substances and apply more times, which increases both the monetary and labor cost. The runoff also results in these chemical materials finding their way into the soil and the ground water, and into rivers, lakes, ponds and ultimately the bays and oceans. While these chemicals do enhance the growth of desirable plants, the runoff has toxic effects. Thus, there is a need for environmentally friendly and sustainable means for enhancing plant growth.

*Chlorella*, a genus of single-celled green microalgae, is considered the most photosynthetically efficient organism in the world. *Chlorella*'s chlorophyll content can reach levels as high as 8%; approximately 16 times more than most green foods. *Chlorella* conducts photosynthesis through the absorption of sunlight by chlorophyll A, chlorophyll B, and carotenoid pigments located in its chloroplast.

It has now been recognized that various characteristics including the quality, health, and/or color of plants can be improved through the application of effective amounts of biomass that has been obtained from the cell tissue of *Chlorella* species. In addition, application of *Chlorella* biomass to soil increases soil aggregation and water retention thereby providing a more productive growth medium for plants. There is a need to develop effective *Chlorella*-based agricultural products to supplement or replace chemical soil amendments and enhance crop growth and yield in a sustainable manner.

SUMMARY

The present invention provides a mixture comprising: a) a first liquid composition comprising a culture of microalgae, the microalgae comprising whole pasteurized *Chlorella* cells; and b) a second liquid composition comprising a culture of microalgae, the microalgae comprising lysed pasteurized *Chlorella* cells; wherein a combination of the first liquid composition and the second liquid composition exhibits synergy.

In some aspects, the first liquid composition is formulated for application to a plant as a soil drench or in-furrow treatment. In other aspects, the second liquid composition is formulated for application to a plant propagation material or as a foliar treatment. In one aspect, the second liquid composition is formulated for application as a seed treatment.

In yet other aspects, the first liquid composition is in a concentration in the range of 0.003%-0.080% solids by weight. In one aspect, the second liquid composition is formulated for application to a plant propagation material and is in a concentration in the range of 1%-20% solids by weight. In another aspect, the second liquid composition is formulated as a foliar treatment and is in a concentration in the range of 0.003%-0.080% solids by weight.

In certain aspects, the whole pasteurized *Chlorella* cells and/or the lysed pasteurized *Chlorella* cells are pasteurized at a temperature ranging from 50° C. to 90° C. In other aspects, the lysed pasteurized *Chlorella* cells are lysed with a bead mill, a shear mill, a pulsed electron field (PEF), high pressure homogenization, an enzyme, a chemical solvent, or a combination thereof.

In one aspect, the ratio by weight of whole pasteurized *Chlorella* cells to lysed pasteurized *Chlorella* cells is from 1:500 to 500:1.

In another aspect, the first liquid composition and/or the second liquid composition further comprise at least one culture stabilizer selected from the group consisting of potassium sorbate, phosphoric acid, ascorbic acid, sodium benzoate, and any combination thereof.

In some aspects, the present invention relates to a plant propagation material treated with a mixture disclosed herein in an amount of from 0.01 g to 10 kg per 100 kg of plant propagation material. In one aspect, the plant propagation material is a cover crop. In another aspect, the cover crop is clover or cereal rye. In another aspect, the cover crop is pasture.

In other aspects, the present invention relates to a kit for preparing an agricultural composition, the kit comprising: a) a composition comprising the first liquid composition as defined herein and at least one auxiliary; and b) a composition comprising the second liquid composition as defined herein and at least one auxiliary.

In one aspect, the present invention provides a mixture comprising: a) a first liquid composition formulated for application to a plant as a soil drench or in-furrow treatment comprising a culture of microalgae, the microalgae comprising whole pasteurized *Chlorella* cells; and b) a second liquid composition formulated for application as a seed treatment comprising a culture of microalgae, the microalgae comprising lysed pasteurized *Chlorella* cells; wherein a combination of the first liquid composition and the second liquid composition exhibits synergy.

In another aspect, the present invention relates to a method of treating a plant, a plant part, or the locus surrounding the plant to enhance plant growth or chlorophyll content, the method comprising applying an effective amount of a mixture comprising: a) a first liquid composition treatment comprising a culture of microalgae, the microalgae comprising whole pasteurized *Chlorella* cells;

and b) a second liquid composition treatment comprising a culture of microalgae, the microalgae comprising lysed pasteurized *Chlorella* cells.

In one aspect, the first liquid composition is applied as a soil drench or in-furrow treatment and the second liquid composition is applied to a plant propagation material or as a foliar treatment.

DETAILED DESCRIPTION

Figure 1:
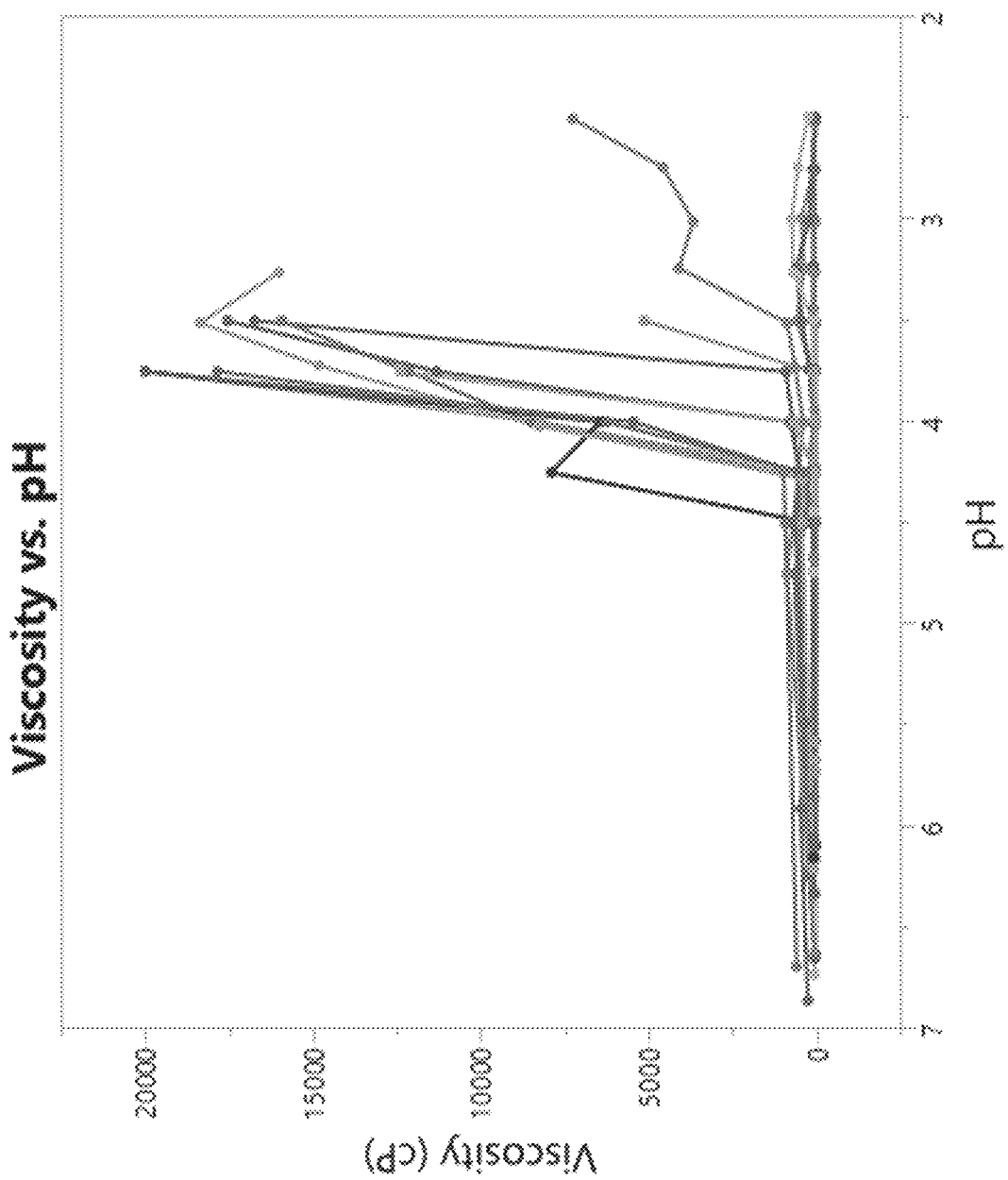
FIG. 1 depicts the viscosity of different preparations of PHYCOTERRA® ST (lysed *Chlorella* microalgae) between about pH 2 and about pH 7 without a washing step. Each line represents a different preparation.

As used herein and in the appended claims, the singular forms "a," "an," and "the" include plural referents unless the context clearly dictates otherwise. For example, "a" or "an" means "at least one" or "one or more."

Throughout this disclosure, various aspects of the claimed subject matter are presented in a range format. It should be understood that the description in range format is merely for convenience and brevity and should not be construed as an inflexible limitation on the scope of the claimed subject matter. Accordingly, the description of a range should be considered to have specifically disclosed all the possible sub-ranges as well as individual numerical values within that range. For example, where a range of values is provided, it is understood that each intervening value, between the upper and lower limit of that range and any other stated or intervening value in that stated range is encompassed within the claimed subject matter. The upper and lower limits of these smaller ranges may independently be included in the smaller ranges, and are also encompassed within the claimed subject matter, subject to any specifically excluded limit in the stated range. Where the stated range includes one or both of the limits, ranges excluding either or both of those included limits are also included in the claimed subject matter. This applies regardless of the breadth of the range.

The term "microalgae" as used herein refers to microscopic single cell organisms such as microalgae, cyanobacteria, algae, diatoms, dinoflagellates, freshwater organisms, marine organisms, or other similar single cell organisms capable of growth in phototrophic, mixotrophic, or heterotrophic culture conditions.

The term "plant propagation material" is to be understood to denote all the generative parts of the plant such as seeds and vegetative plant material such as cuttings and tubers (e.g. potatoes), which can be used for the multiplication of the plant. This includes seeds, roots, fruits, tubers, bulbs, rhizomes, shoots, sprouts and other parts of plants, including seedlings and young plants, which are to be transplanted after germination or after emergence from soil.

The term "auxiliary" as used herein refers to an inert ingredient commonly used in agricultural compositions. Examples of auxiliaries include, but are not limited to, extenders, solvents, diluents, emulsifiers, dispersants, binders, fixing agents, wetting agents, dyes, pigments, antifoams, preservatives, secondary thickeners, and stickers.

Analysis of the DNA sequence of the strain of *Chlorella* sp. described herein was done in the NCBI 18s rDNA reference database at the Culture Collection of Algae at the University of Cologne (CCAC) and showed substantial similarity (i.e., greater than 95%) with multiple known strains of *Chlorella* and Micractinium. Those of skill in the art will recognize that *Chlorella* and Micractinium appear closely related in many taxonomic classification trees for microalgae, and strains and species may be re-classified from time to time within the *Chlorella* and Micractinium genera. As would be understood in the art, the reclassification of various taxa is not unusual, and occurs as developments in science are made. Any disclosure in the specification regarding the classification of exemplary species or strains should be viewed in light of such developments. While the exemplary microalgae strain is referred to in the instant specification as *Chlorella*, it is recognized that microalgae strains in related taxonomic classifications with similar characteristics to the exemplary microalgae strain would reasonably be expected to produce similar results. Accordingly, any mention of *Chlorella* herein should be understood to include Micractinium species genetically and morphologically similar to species classified within the genus *Chlorella* as of the filing date.

By artificially controlling aspects of the microalgae culturing process such as the organic carbon feed (e.g., acetic acid, acetate), oxygen levels, pH, and light, the culturing process differs from the culturing process that microalgae experiences in nature. In addition to controlling various aspects of the culturing process, intervention by human operators or automated systems occurs during the non-axenic mixotrophic culturing of microalgae through contamination control methods to prevent the microalgae from being overrun and outcompeted by contaminating organisms (e.g., fungi, bacteria). Contamination control methods for microalgae cultures are known in the art and such suitable contamination control methods for non-axenic mixotrophic microalgae cultures are disclosed in WO2014/074769A2 (Ganuza, et al.), hereby incorporated by reference. By intervening in the microalgae culturing process, the impact of the contaminating microorganisms can be mitigated by suppressing the proliferation of containing organism populations and the effect on the microalgal cells (e.g., lysing, infection, death, clumping). Thus, through artificial control of aspects of the culturing process and intervening in the culturing process with contamination control methods, the microalgae culture produced as a whole and used in the described inventive compositions differs from the culture that results from a microalgae culturing process that occurs in nature.

In some embodiments and Examples below, the microalgae composition may be referred to as PHYCOTERRA® or PHYCOTERRA® ST. The PHYCOTERRA® or PHYCOTERRA® ST *Chlorella* microalgae composition is a microalgae composition comprising *Chlorella*. The PHYCOTERRA® product contains whole cell *Chlorella* biomass while the PHYCOTERRA® ST contains lysed cell *Chlorella* biomass. The PHYCOTERRA® *Chlorella* microalgae composition treatments were prepared by growing the *Chlorella* in non-axenic acetic acid supplied mixotrophic conditions, increasing the concentration of *Chlorella* using a centrifuge, pasteurizing the concentrated *Chlorella* at between 65° C.-75° C. for between 90-150 minutes, adding potassium sorbate and phosphoric acid to stabilize the pH of the *Chlorella*, and then adjusting the whole biomass treatment to the desired concentration. The PHYCOTERRA® *Chlorella* microalgae composition may comprise approximately 10% w/w of *Chlorella* microalgae cells. Furthermore, the PHYCOTERRA® *Chlorella* microalgae composition may comprise between approximately 0.3% potassium sorbate and between approximately 0.5%-1.5% phosphoric acid to stabilize the pH of the *Chlorella* to between 3.0-4.0 and 88.2%-89.2% water. It should be clearly understood, however, that other variations of the PHYCOTERRA® *Chlorella* microalgae composition, including variations in the microalgae strains, variations in the stabilizers, and/or variations in the % composition of each component may be used and may achieve similar results.

In some embodiments and Examples below, the microalgae composition may be an OMRI certified microalgae composition referred to as TERRENE®. The OMRI certified TERRENE® *Chlorella* microalgae composition is a microalgae composition comprising *Chlorella*. The OMRI certified TERRENE® *Chlorella* microalgae composition treatments were prepared by growing the *Chlorella* in non-axenic acetic acid supplied mixotrophic conditions, increasing the concentration of *Chlorella* using a centrifuge, pasteurizing the concentrated *Chlorella* at between 65° C.-75° C. for between 90-150 minutes, adding citric acid to stabilize the pH of the *Chlorella*, and then adjusting the whole biomass treatment to the desired concentration. The OMRI certified TERRENE® *Chlorella* microalgae composition may comprise approximately 10% w/w of *Chlorella* microalgae cells. Furthermore, the OMRI certified TERRENE® *Chlorella* microalgae composition may comprise between approximately 0.5%-2.0% citric acid to stabilize the pH of the *Chlorella* to between 3.0-4.0 and 88%-89.5% water. It should be clearly understood, however, that other variations of the OMRI certified TERRENE® *Chlorella* microalgae composition, including variations in the microalgae strains, variations in the stabilizers, and/or variations in the % composition of each component may be used and may achieve similar results.

In some embodiments and Examples below, the microalgae composition may be an OMRI certified microalgae composition referred to as OMRI certified TERRENE® *Chlorella* pasteurized at 65° C. microalgae composition or as TERRENE65. The OMRI certified TERRENE® *Chlorella* pasteurized at 65° C. microalgae composition is a microalgae composition comprising *Chlorella*. The OMRI certified TERRENE® *Chlorella* pasteurized at 65° C. microalgae composition treatments were prepared by growing the *Chlorella* in non-axenic acetic acid supplied mixotrophic conditions, increasing the concentration of *Chlorella* using a centrifuge, pasteurizing the concentrated *Chlorella* at 65° C. for between 90-150 minutes, adding citric acid to stabilize the pH of the *Chlorella*, and then adjusting the whole biomass treatment to the desired concentration. The OMRI certified TERRENE® *Chlorella* pasteurized at 65° C. microalgae composition may comprise approximately 10% w/w of *Chlorella* microalgae cells. Furthermore, the OMRI certified TERRENE® *Chlorella* pasteurized at 65° C. microalgae composition may comprise between approximately 0.5%-2.0% citric acid to stabilize the pH of the *Chlorella* to between 3.0-4.0 and 88-89.5% water. It should be clearly understood, however, that other variations of the OMRI certified TERRENE® *Chlorella* pasteurized at 65° C.

microalgae composition, including variations in the microalgae strains, variations in the stabilizers, variations in the pasteurization temperature, and/or variations in the % composition of each component may be used and may achieve similar results.

In some embodiments and Examples below, the microalgae composition may be an OMRI certified microalgae composition referred to as OMRI certified TERRENE® *Chlorella* pasteurized at 90° C. microalgae composition or as TERRENE90. The OMRI certified TERRENE® *Chlorella* pasteurized at 90° C. microalgae composition is a microalgae composition comprising *Chlorella*. The OMRI certified TERRENE® *Chlorella* pasteurized at 90° C. microalgae composition treatments were prepared by growing the *Chlorella* in non-axenic acetic acid supplied mixotrophic conditions, increasing the concentration of *Chlorella* using a centrifuge, pasteurizing the concentrated *Chlorella* at 90° C. for between 90-150 minutes, adding citric acid to stabilize the pH of the *Chlorella*, and then adjusting the whole biomass treatment to the desired concentration. The OMRI certified TERRENE® *Chlorella* pasteurized at 90° C. microalgae composition may comprise approximately 10% w/w of *Chlorella* microalgae cells. Furthermore, the OMRI certified TERRENE® *Chlorella* pasteurized at 90° C. microalgae composition may comprise between approximately 0.5%-2.0% citric acid to stabilize the pH of the *Chlorella* to between 3.0-4.0 and 88-89.5% water. It should be clearly understood that other variations of the OMRI certified TERRENE® *Chlorella* pasteurized at 90° C. microalgae composition, including variations in the microalgae strains, variations in the stabilizers, variations in the pasteurization temperature, and/or variations in the % composition of each component may be used and may achieve similar results.

A liquid composition comprising microalgae can be stabilized by heating and cooling in a pasteurization process. In certain aspects, the active ingredients of the microalgae based compositions maintain effectiveness in enhancing at least one characteristic of a plant after being subjected to the heating and cooling of a pasteurization process. In other embodiments, liquid compositions with whole cells or processed cells (e.g., dried, lysed, extracted) of microalgae cells may not need to be stabilized by pasteurization. For example, microalgae cells that have been processed, such as by drying, lysing, and extraction, or extracts can include such low levels of bacteria that a liquid composition can remain stable without being subjected to the heating and cooling of a pasteurization process.

In some embodiments, the composition is lysed. Lysing is a technique where the cell membrane of a cell is ruptured, which releases lysate, the fluid contents of lysed cells, from the cells. As an example, the lysing process can comprise anything suitable that ruptures a cell membrane. For example, a bead mill may be used for lysing, where feedstock biomass solids can be dispersed and wetted (e.g., placed into a liquid phase). In this example the bead mill can utilize ceramic, glass, or metal beats (e.g., of a suitable size for the desired result) disposed in a chamber, such as a rotating cylinder, to collide with and mechanically macerate the solid biomass in the mill, which can help rupture the cell walls (e.g., the hydrogen bonds that hold together a cell membrane). Accordingly, in this example, the whole biomass may be lysed with water at cooler temperatures, with the resulting lysate comprising lipids in the form of an oil, biomass cell contents and unbroken biomass solid (e.g., non-target portion of biomass), and water.

In another aspect, the biomass is lysed using a shear mill. A shear mill utilizes a rotating impeller or high-speed rotor to create flow and shear of its contents. This causes the solid particles, such as biomass solid, to rupture due to shear stress.

In another aspect, the biomass is lysed using a pulsed electron field (PEF), high pressure homogenization, enzymes, and/or a chemical means (e.g., with a solvent).

In some embodiments, the composition can be heated to a temperature in the range of 50-130° C. In some embodiments, the composition can be heated to a temperature in the range of 55-65° C. In some embodiments, the composition can be heated to a temperature in the range of 58-62° C. In some embodiments, the composition can be heated to a temperature in the range of 50-60° C. In some embodiments, the composition can be heated to a temperature in the range of 60-90° C. In some embodiments, the composition can be heated to a temperature in the range of 70-80° C. In some embodiments, the composition can be heated to a temperature in the range of 100-150° C. In some embodiments, the composition can be heated to a temperature in the range of 120-130° C.

In some embodiments, the composition can be heated for a time period in the range of 1-150 minutes. In some embodiments, the composition can be heated for a time period in the range of 110-130 minutes. In some embodiments, the composition can be heated for a time period in the range of 90-100 minutes. In some embodiments, the composition can be heated for a time period in the range of 100-110 minutes. In some embodiments, the composition can be heated for a time period in the range of 110-120 minutes. In some embodiments, the composition can be heated for a time period in the range of 120-130 minutes. In some embodiments, the composition can be heated for a time period in the range of 130-140 minutes. In some embodiments, the composition can be heated for a time period in the range of 140-150 minutes. In some embodiments, the composition is heated for less than 15 min. In some embodiments, the composition is heated for less than 2 min.

After the step of heating or subjecting the liquid composition to high temperatures is complete, the compositions can be cooled at any rate to a temperature that is safe to work with. In one non-limiting embodiment, the composition can be cooled to a temperature in the range of 35-45° C. In some embodiments, the composition can be cooled to a temperature in the range of 36-44° C. In some embodiments, the composition can be cooled to a temperature in the range of 37-43° C. In some embodiments, the composition can be cooled to a temperature in the range of 38-42° C. In some embodiments, the composition can be cooled to a temperature in the range of 39-41° C. In further embodiments, the pasteurization process can be part of a continuous production process that also involves packaging, and thus the liquid composition can be packaged (e.g., bottled) directly after the heating or high temperature stage without a cooling step.

In some embodiments, the composition can include 2.5-30% solids by weight of microalgae cells (i.e., 2.5-30 g of microalgae cells/100 mL of the liquid composition). In some embodiments, the composition can include 2.5-5% solids by weight of microalgae cells (i.e., 2.5-5 g of microalgae cells/100 mL of the liquid composition). In some embodiments, the composition can include 5-20% solids by weight of microalgae cells. In some embodiments, the composition can include 5-15% solids by weight of microalgae cells. In some embodiments, the composition can include 5-10% solids by weight of microalgae cells. In some embodiments, the composition can include 10-20% solids by weight of microalgae cells. In some embodiments, the composition can include 10-20% solids by weight of microalgae cells. In some embodiments, the composition can include 20-30% solids by weight of microalgae cells. In some embodiments, further dilution of the microalgae cells percent solids by weight can occur before application for low concentration applications of the composition.

In some embodiments, the composition can include less than 1% by weight of microalgae biomass or extracts (i.e., less than 1 g of microalgae derived product/100 mL of the liquid composition). In some embodiments, the composition can include less than 0.9% by weight of microalgae biomass or extracts. In some embodiments, the composition can include less than 0.8% by weight of microalgae biomass or extracts. In some embodiments, the composition can include less than 0.7% by weight of microalgae biomass or extracts. In some embodiments, the composition can include less than 0.6% by weight of microalgae biomass or extracts. In some embodiments, the composition can include less than 0.5% by weight of microalgae biomass or extracts. In some embodiments, the composition can include less than 0.4% by weight of microalgae biomass or extracts. In some embodiments, the composition can include less than 0.3% by weight of microalgae biomass or extracts. In some embodiments, the composition can include less than 0.2% by weight of microalgae biomass or extracts. In some embodiments, the composition can include less than 0.1% by weight of microalgae biomass or extracts. In some embodiments, the composition can include at least 0.0001% by weight of microalgae biomass or extracts. In some embodiments, the composition can include at least 0.001% by weight of microalgae biomass or extracts. In some embodiments, the composition can include at least 0.01% by weight of microalgae biomass or extracts. In some embodiments, the composition can include at least 0.1% by weight of microalgae biomass or extracts. In some embodiments, the composition can include 0.0001-1% by weight of microalgae biomass or extracts. In some embodiments, the composition can include 0.0001-0.001% by weight of microalgae biomass or extracts. In some embodiments, the composition can include 0.001-0.01% by weight of microalgae biomass or extracts. In some embodiments, the composition can include 0.01-0.1% by weight of microalgae biomass or extracts. In some embodiments, the composition can include 0.1-1% by weight of microalgae biomass or extracts.

In some embodiments, an application concentration of 0.1% of microalgae biomass or extract equates to 0.04 g of microalgae biomass or extract in 40 mL of a composition. While the desired application concentration to a plant can be 0.1% of microalgae biomass or extract, the composition can be packaged as a 10% concentration (0.4 mL in 40 mL of a composition). Thus, a desired application concentration of 0.1% would require 6,000 mL of the 10% microalgae biomass or extract in the 100 gallons of water applied to the assumption of 15,000 plants in an acre, which is equivalent to an application rate of about 1.585 gallons per acre. In some embodiments, a desired application concentration of 0.01% of microalgae biomass or extract using a 10% concentration composition equates to an application rate of about 0.159 gallons per acre. In some embodiments, a desired application concentration of 0.001% of microalgae biomass or extract using a 10% concentration composition equates to an application rate of about 0.016 gallons per acre. In some embodiments, a desired application concentration of 0.0001% of microalgae biomass or extract using a 10% concentration composition equates to an application rate of about 0.002 gallons per acre.

In another non-limiting embodiment, correlating the application of the microalgae biomass or extract on a per plant basis using the assumption of 15,000 plants per acre, the composition application rate of 1 gallon per acre is equal to about 0.25 mL per plant=0.025 g per plant=25 mg of microalgae biomass or extract per plant. The water requirement assumption of 100 gallons per acre is equal to about 35 mL of water per plant. Therefore, 0.025 g of microalgae biomass or extract in 35 mL of water is equal to about 0.071 g of microalgae biomass or extract per 100 mL of composition equates to about a 0.07% application concentration. In some embodiments, the microalgae biomass or extract based composition can be applied at a rate in a range as low as about 0.001-10 gallons per acre, or as high as up to 150 gallons per acre.

In some embodiments, the applications are performed using a 10% solids solution by weight microalgae composition. For greenhouse trials, the rates vary and essentially refer to how much volume of the 10% solids solution are added in a given volume of water (e.g. 2.5% v/v-5.0% v/v).

According to one embodiment, individual components of the composition according to the invention such as parts of a kit or parts of a binary mixture may be mixed by the user himself in a spray tank or any other kind of vessel used for applications (e.g., seed treater drums, seed pelleting machinery, knapsack sprayer) and further auxiliaries may be added, if appropriate. Consequently, one embodiment of the invention is a kit for preparing an agricultural composition, the kit comprising a) a composition comprising whole pasteurized *Chlorella* cells as defined herein and at least one auxiliary; and/or b) a composition comprising lysed pasteurized *Chlorella* cells as defined herein and at least one auxiliary.

Additionally, the present invention is directed to a method of treating a plant, a plant part, such as a seed, root, rhizome, corm, bulb, or tuber, and/or a locus on which or near which the plant or the plant parts grow, such as soil, to enhance plant growth comprising the step of simultaneously or sequentially applying to a plant, a plant part and/or a plant loci: a) a first liquid composition comprising a culture of microalgae, the microalgae comprising whole pasteurized *Chlorella* cells; and b) a second liquid composition comprising a culture of microalgae, the microalgae comprising lysed pasteurized *Chlorella* cells.

The compositions disclosed herein may be applied in any desired manner, such as in the form of a seed coating, soil drench, and/or directly in-furrow and/or as a foliar spray and applied either pre-emergence, post-emergence or both. In other words, the compositions can be applied to the seed, the plant or to the soil wherein the plant is growing or wherein it is desired to grow (plant's locus of growth).

In some embodiments, the liquid microalgae based composition may be applied to soil, seeds, and plants in an in-furrow application. An application of the microalgae based composition in-furrow requires a low amount of water and targets the application to a small part of the field. The application in-furrow also concentrates the application of the microalgae based composition at a place where the seedling radicles and roots will pick up the material in the composition or make use of captured nutrients, including phytohormones.

In some embodiments, the liquid microalgae based composition may be applied to soil, seeds, and plants as a side dress application. One of the principals of plant nutrient applications is to concentrate the nutrients in an area close to the root zone so that the plant roots will encounter the nutrients as the plant grows. Side-dress applications use a "knife" that is inserted into the soil and delivers the nutrients around 2 inches along the row and about 2 inches or more deep. Side-dress applications are made when the plants are young and prior to flowering to support yield. Side-dress applications can only be made prior to planting in drilled crops, i.e. wheat and other grains, and alfalfa, but in row crops such as peppers, corn, tomatoes they can be made after the plants have emerged.

In some embodiments, the liquid microalgae based composition may be applied to soil, seeds, and plants through a drip system. Depending on the soil type, the relative concentrations of sand, silt and clay, and the root depth, the volume that is irrigated with a drip system may be about V3 of the total soil volume. The soil has an approximate weight of 4,000,000 lbs. per acre one foot deep. Because the roots grow where there is water, the plant nutrients in the microalgae based composition would be delivered to the root system where the nutrients will impact most or all of the roots. Experimental testing of different application rates to develop a rate curve would aid in determining the optimum rate application of a microalgae based composition in a drip system application.

In some embodiments, the liquid microalgae based composition may be applied to soil, seeds, and plants through a pivot irrigation application. The quantity and frequency of water delivered over an area by a pivot irrigation system is dependent on the soil type and crop. Applications may be 0.5 inch or more and the exact demand for water can be quantitatively measured using soil moisture gauges. For crops such as alfalfa that are drilled in (very narrow row spacing), the roots occupy the entire soil area. Penetration of the soil by the microalgae based composition may vary with a pivot irrigation application but would be effective as long as the application can target the root system of the plants. In some embodiments, the microalgae based composition may be applied in a broadcast application to plants with a high concentration of plants and roots, such as row crops.

In certain aspects, the liquid microalgae based composition is applied at 0.1-150 gallons per acre, 0.1-50 gallons per acre, or 0.1-10 gallons per acre.

In certain aspects, the present invention provides a method of treating a plant, a plant part, or the locus surrounding the plant to enhance plant growth, the method comprising applying an effective amount of a mixture comprising: a) a first liquid composition treatment comprising a culture of microalgae, the microalgae comprising whole pasteurized *Chlorella* cells; and b) a second liquid composition treatment comprising a culture of microalgae, the microalgae comprising lysed pasteurized *Chlorella* cells. In one aspect, the presence of the whole pasteurized *Chlorella* cells and the lysed pasteurized *Chlorella* cells in the first liquid composition and the second liquid composition enhances the growth of the plant compared to compositions comprising non-pasteurized *Chlorella* cells, which lack the whole pasteurized *Chlorella* cells and the lysed pasteurized *Chlorella* cells. In other aspects, the application of the first liquid composition and the second liquid composition produces a synergistic enhancement of plant growth.

The present invention involves the use of a microalgae composition. Microalgae compositions, methods of preparing liquid microalgae compositions, and methods of applying the microalgae compositions to plants are disclosed in WO 2017/218896 A1 (Shinde et al.) entitled "Microalgae-Based Composition, and Methods of its Preparation and Application to Plants," which is incorporated herein in full by reference. In one or more embodiments, the microalgae composition may comprise approximately 10%-10.5% w/w of *Chlorella* microalgae cells. In one or more embodiments, the microalgae composition may also comprise one of more stabilizers, such as potassium sorbate, phosphoric acid, ascorbic acid, sodium benzoate, citric acid, or the like, or any combination thereof. For example, in one or more embodiments, the microalgae composition may comprise approximately 0.3% w/w of potassium sorbate or another similar compound to stabilize its pH and may further comprise approximately 0.5-1.5% w/w phosphoric acid or another similar compound to prevent the growth of contaminants. As a further example, in one or more embodiments where it is desired to use an OMRI (Organic Materials Review Institute) certified organic composition, the microalgae composition may comprise 1.0-2.0% w/w citric acid to stabilize its pH, and may not contain potassium sorbate or phosphoric acid. In one or more embodiments, the pH of the microalgae composition may be stabilized to between 3.0-4.0.

In some embodiments, the composition is a liquid and substantially includes of water. In some embodiments, the composition can include 70-99% water. In some embodiments, the composition can include 85-95% water. In some embodiments, the composition can include 70-75% water. In some embodiments, the composition can include 75-80% water. In some embodiments, the composition can include 80-85% water. In some embodiments, the composition can include 85-90% water. In some embodiments, the composition can include 90-95% water. In some embodiments, the composition can include 95-99% water. The liquid nature and high-water content of the composition facilitates administration of the composition in a variety of manners, such as but not limit to: flowing through an irrigation system, flowing through an above ground drip irrigation system, flowing through a buried drip irrigation system, flowing through a central pivot irrigation system, sprayers, sprinklers, and water cans.

In some embodiments, the liquid composition can be used immediately after formulation, or can be stored in containers for later use. In some embodiments, the composition can be stored out of direct sunlight. In some embodiments, the composition can be refrigerated. In some embodiments, the composition can be stored at 1-10° C. In some embodiments, the composition can be stored at 1-3° C. In some embodiments, the composition can be stored at 3-50° C. In some embodiments, the composition can be stored at 5-8° C. In some embodiments, the composition can be stored at 8-10° C.

In some embodiments, administration of the liquid composition to soil, a seed or plant can be in an amount effective to produce an enhanced characteristic in plants compared to a substantially identical population of untreated seeds or plants. Such enhanced characteristics can include accelerated seed germination, accelerated seedling emergence, improved seedling emergence, improved leaf formation, accelerated leaf formation, improved plant maturation, accelerated plant maturation, increased plant yield, increased plant growth, increased plant quality, increased plant health, increased fruit yield, increased fruit sweetness, increased fruit growth, and increased fruit quality. Non-limiting examples of such enhanced characteristics can include accelerated achievement of the hypocotyl stage, accelerated protrusion of a stem from the soil, accelerated achievement of the cotyledon stage, accelerated leaf formation, increased marketable plant weight, increased marketable plant yield, increased marketable fruit weight, increased production plant weight, increased production fruit weight, increased utilization (indicator of efficiency in the agricultural process based on ratio of marketable fruit to unmarketable fruit), increased chlorophyll content (indicator of plant health), increased plant weight (indicator of plant health), increased root weight (indicator of plant health), increased shoot weight (indicator of plant health), increased plant height, increased thatch height, increased resistance to salt stress, increased plant resistance to heat stress (temperature stress), increased plant resistance to heavy metal stress, increased plant resistance to drought, increased plant resistance to disease, improved color, reduced insect damage, reduced blossom end rot, and reduced sun burn. Such enhanced characteristics can occur individually in a plant, or in combinations of multiple enhanced characteristics.

Improvements in chlorophyll content can be determined by various methods. In some aspects, the measurement of chlorophyll content utilizes non-destructive tissue tests. Non-destructive tissue tests can be performed easily in the field and provide results much faster than laboratory tests. There are a number of chlorophyll content meters that are used for these tests. The meters determine chlorophyll content by shining a light through a leaf inserted in a slot and measuring the amount of light transmitted.

Chlorophyll meters use different units of measure. For instance, while Minolta uses "SPAD units", Force-A uses the Dualex Unit and ADC uses a Chlorophyll Content Index. All measure essentially the same thing, and conversion tables are available.

In other aspects, chlorophyll content is measured using chlorophyll fluorescence. In his scientific paper Gitelson (1999) states, "The ratio between chlorophyll fluorescence, at 735 nm and the wavelength range 700 nm to 710 nm, F735/F700 was found to be linearly proportional to the chlorophyll content (with determination coefficient, r2, more than 0.95) and thus this ratio can be used as a precise indicator of chlorophyll content in plant leaves." See Gitelson, Anatoly A; Buschmann, Claus; Lichtenthaler, Hartmut K (1999). "The Chlorophyll Fluorescence Ratio F735/F700 as an Accurate Measure of the Chlorophyll Content in Plants". Remote Sensing of Environment. 69 (3): 296. The fluorescent ratio chlorophyll content meters use this technique to perform measurements.

Chlorophyll fluorometers are designed to measure variable fluorescence of photosystem II, or PSII. With most types of plant stress, this variable fluorescence can be used to measure the level of plant stress. The most commonly used protocols include: Fv/Fm, a dark adapted protocol, Y(II) or ΔF/Fm' a light adapted test that is used during steady state photosynthesis, and various OJIP, dark adapted protocols that follow different schools of thought. Longer fluorescence quenching protocols can also be used for plant stress measurement, but because the time required for a measurement is extremely long, only small plant populations can generally be tested. NPQ or non-photochemical quenching is the most popular of these quenching parameters, but other parameters and other quenching protocols are also used.

Another test protocol based on fluorescence is the OJIP test. This method analyses the increase in fluorescence emitted from dark-adapted leaves when they are illuminated. The rise in fluorescence during the first second of illumination follows a curve with intermediate peaks, called the O, J, I, and P steps. In addition, the K step appears during specific types of stress, such as N-deficiency. Research has shown the K step is able to measure N-stress.

In some embodiments, a liquid composition can be administered before the seed is planted. In some embodiments, a liquid composition can be administered at the time the seed is planted. In some embodiments, a liquid composition can be applied by dip treatment of the roots. In some embodiments, a liquid composition can be administered to plants that have emerged from the ground. In some embodiments, a liquid or dried composition can be applied to the soil before, during, or after the planting of a seed. In some embodiments a liquid or dried composition can be applied to the soil before or after a plant emerges from the soil.

In some embodiments, the volume or mass of the microalgae based composition applied to a seed, seedling, or plant may not increase or decrease during the growth cycle of the plant (i.e., the amount of the microalgae composition applied to the plant will not change as the plant grows larger). In some embodiments, the volume or mass of the microalgae based composition applied to a seed, seedling, or plant can increase during the growth cycle of the plant (i.e., applied on a mass or volume per plant mass basis to provide more of the microalgae composition as the plant grows larger). In some embodiments, the volume or mass of the microalgae based composition applied to a seed, seedling, or plant can decrease during the growth cycle of the plant (i.e., applied on a mass or volume per plant mass basis to provide more of the microalgae composition as the plant grows larger).

In one non-limiting embodiment, the administration of the composition may comprise contacting the foliage of the plant with an effective amount of the composition. In some embodiments, the liquid composition may be sprayed on the foliage by a hand sprayer, a sprayer on an agriculture implement, or a sprinkler. In some embodiments, the composition can be applied to the soil.

The foliar treatment formulations usable in accordance with the invention can be used to treat either directly or after preceding dilution with water. The foliar treatment preparations usable in accordance with the invention or the dilute preparations thereof can also be used to dress seed of transgenic plants.

For foliar treatment a variety of applications may be used. In one embodiment the application method is selected from the group comprising of spray application, drip-and-drench application, and chemigation. In one embodiment, spray application is preferred.

The rate of application of the composition at the desired concentration can be expressed as a volume per area. In some embodiments, the rate of application of the liquid composition in a foliar application can comprise a rate in the range of 10-50 gallons/acre. In some embodiments, the rate of application of the liquid composition in a foliar application can comprise a rate in the rage of 10-15 gallons/acre. In some embodiments, the rate of application of the liquid composition in a foliar application can comprise a rate in the range of 15-20 gallons/acre. In some embodiments, the rate of application of the liquid composition in a foliar application can comprise a rate in the range of 20-25 gallons/acre. In some embodiments, the rate of application of the liquid composition in a foliar application can comprise a rate in the range of 25-30 gallons/acre. In some embodiments, the rate of application of the liquid composition in a foliar application can comprise a rate in the range of 30-35 gallons/acre. In some embodiments, the rate of application of the liquid composition in a foliar application can comprise a rate in the range of 35-40 gallons/acre. In some embodiments, the rate of application of the liquid composition in a foliar application can comprise a rate in the range of 40-45 gallons/acre.

In some embodiments, the rate of application of the liquid composition in a foliar application can comprise a rate in the range of 45-50 gallons/acre.

In some embodiments, the rate of application of the liquid composition in a soil or foliar application can comprise a rate in the range of 0.01-10 gallons/acre. In some embodiments, the rate can be 0.12-4%. In some embodiments, the rate of application of the liquid composition in a foliar application may comprise a rate in the range of 0.01-0.1 gallons/acre. In some embodiments, the rate of application of the liquid composition in a soil or foliar application may comprise a rate in the range of 0.1-1.0 gallons/acre. In some embodiments, the rate of application of the liquid composition in a foliar application may comprise a rate in the range of 0.25-2 gallons/acre. In some embodiments, the rate of application of the liquid composition in a foliar application may comprise a rate in the range of 1-2 gallons/acre. In some embodiments, the rate of application of the liquid composition in a foliar application may comprise a rate in the range of 2-3 gallons/acre. In some embodiments, the rate of application of the liquid composition in a foliar application may comprise a rate in the range of 3-4 gallons/acre. In some embodiments, the rate of application of the liquid composition in a foliar application may comprise a rate in the range of 4-5 gallons/acre. In some embodiments, the rate of application of the liquid composition in a foliar application may comprise a rate in the range of 5-10 gallons/acre.

In some embodiments, the v/v ratio of the composition can be between 0.001%-50%. The v/v ratio can be between 0.01-25%. The v/v ratio of the composition can be between 0.03-10%.

In another non-limiting embodiment, the administration of the composition can include contacting the soil in the immediate vicinity of the planted seed with an effective amount of the composition. In some embodiments, the liquid composition can be supplied to the soil by injection into a low volume irrigation system, such as but not limited to a drip irrigation system supplying water beneath the soil through perforated conduits or at the soil level by fluid conduits hanging above the ground or protruding from the ground. In some embodiments, the liquid composition can be supplied to the soil by a soil drench method wherein the liquid composition is poured on the soil.

The composition can be diluted to a lower concentration for an effective amount in a soil application by mixing a volume of the composition in a volume of water. The percent solids of microalgae sourced components resulting in the diluted composition can be calculated by the multiplying the original concentration in the composition by the ratio of the volume of the composition to the volume of water. Alternatively, the grams of microalgae sourced components in the diluted composition can be calculated by the multiplying the original grams of microalgae sourced components per 100 mL by the ratio of the volume of the composition to the volume of water.

The rate of application of the composition at the desired concentration can be expressed as a volume per area. In some embodiments, the rate of application of the liquid composition in a soil application can include a rate in the range of 50-150 gallons/acre. In some embodiments, the rate of application of the liquid composition in a soil application can include a rate in the range of 75-125 gallons/acre. In some embodiments, the rate of application of the liquid composition in a soil application can include a rate in the range of 50-75 gallons/acre. In some embodiments, the rate of application of the liquid composition in a soil application can include a rate in the range of 75-100 gallons/acre. In some embodiments, the rate of application of the liquid composition in a soil application can include a rate in the range of 100-125 gallons/acre. In some embodiments, the rate of application of the liquid composition in a soil application can include a rate in the range of 125-150 gallons/acre.

In some embodiments, the rate of application of the liquid composition in a soil application can include a rate in the range of 10-50 gallons/acre. In some embodiments, the rate of application of the liquid composition in a soil application can include a rate in the range of 10-20 gallons/acre. In some embodiments, the rate of application of the liquid composition in a soil application can include a rate in the range of 20-30 gallons/acre. In some embodiments, the rate of application of the liquid composition in a soil application can include a rate in the range of 30-40 gallons/acre. In some embodiments, the rate of application of the liquid composition in a soil application can include a rate in the range of 40-50 gallons/acre.

In some embodiments, the rate of application of the liquid composition in a soil application can include a rate in the range of 0.01-10 gallons/acre. In some embodiments, the rate of application of the liquid composition in a soil application can include a rate in the range of 0.01-0.1 gallons/acre. In some embodiments, the rate of application of the liquid composition in a soil application can include a rate in the range of 0.1-1.0 gallons/acre. In some embodiments, the rate of application of the liquid composition in a soil application can include a rate in the range of 1-2 gallons/acre. In some embodiments, the rate of application of the liquid composition in a soil application can include a rate in the range of 2-3 gallons/acre. In some embodiments, the rate of application of the liquid composition in a soil application can include a rate in the range of 3-4 gallons/acre. In some embodiments, the rate of application of the liquid composition in a soil application can include a rate in the range of 4-5 gallons/acre. In some embodiments, the rate of application of the liquid composition in a soil application can include a rate in the range of 5-10 gallons/acre.

In some embodiments, the rate of application of the liquid composition in a soil application can include a rate in the range of 2-20 liters/acre. In some embodiments, the rate of application of the liquid composition in a soil application can include a rate in the range of 3.7-15 liters/acre. In some embodiments, the rate of application of the liquid composition in a soil application can include a rate in the range of 2-5 liters/acre. In some embodiments, the rate of application of the liquid composition in a soil application can include a rate in the range of 5-10 liters/acre. In some embodiments, the rate of application of the liquid composition in a soil application can include a rate in the range of 10-15 liters/acre. In some embodiments, the rate of application of the liquid composition in a soil application can include a rate in the range of 15-20 liters/acre.

Many plants can benefit from the application of liquid compositions that provide a bio-stimulatory effect. Non-limiting examples of plant families that can benefit from such compositions include plants from the following: Solanaceae, Fabaceae (Leguminosae), Poaceae, Roasaceae, Vitaceae, Brassicaeae (Cruciferae), Caricaceae, Malvaceae, Sapindaceae, Anacardiaceae, Rutaceae, Moraceae, Convolvulaceae, Lamiaceae, Verbenaceae, Pedaliaceae, Asteraceae (Compositae), Apiaceae (Umbelliferae), Araliaceae, Oleaceae, Ericaceae, Actinidaceae, Cactaceae, Chenopodiaceae, Polygonaceae, Theaceae, Lecythidaceae, Rubiaceae, Papveraceae, Illiciaceae Grossulariaceae, Myrtaceae, Juglandaceae, Bertulaceae, Cucurbitaceae, Asparagaceae (Liliaceae), Alliaceae (Liliceae), Bromeliaceae, Zingieraceae, Muscaceae, Areaceae, Dioscoreaceae, Myristicaceae, Annonaceae, Euphorbiaceae, Lauraceae, Piperaceae, Proteaceae, and Cannabaceae.

The Solanaceae plant family includes a large number of agricultural crops, medicinal plants, spices, and ornamentals in its over 2,500 species. Taxonomically classified in the Plantae kingdom, Tracheobionta (subkingdom), Spermatophyta (superdivision), Magnoliophyta (division), Manoliopsida (class), Asteridae (subclass), and Solanales (order), the Solanaceae family includes, but is not limited to, potatoes, tomatoes, eggplants, various peppers, tobacco, and petunias. Plants in the Solanaceae can be found on all the continents, excluding *Antarctica*, and thus have a widespread importance in agriculture across the globe.

The Rosaceae plant family includes flowering plants, herbs, shrubs, and trees. Taxonomically classified in the Plantae kingdom, Tracheobionta (subkingdom), Spermatophyta (superdivision), Magnoliophyta (division), Magnoliopsida (class), Rosidae (subclass), and Rosales (order), the Rosaceae family includes, but is not limited to, almond, apple, apricot, blackberry, cherry, nectarine, peach, plum, raspberry, strawberry, and quince.

The Fabaceae plant family (also known as the Leguminosae) comprises the third largest plant family with over 18,000 species, including a number of important agricultural and food plants. Taxonomically classified in the Plantae kingdom, Tracheobionta (subkingdom), Spermatophyta (superdivision), Magnoliophyta (division), Manoliopsida (class), Rosidae (subclass), and Fabales (order), the Fabaceae family includes, but is not limited to, soybeans, beans, green beans, peas, chickpeas, alfalfa, peanuts, sweet peas, carob, and liquorice. Plants in the Fabaceae family can range in size and type, including but not limited to, trees, small annual herbs, shrubs, and vines, and typically develop legumes. Plants in the Fabaceae family can be found on all the continents, excluding *Antarctica*, and thus have a widespread importance in agriculture across the globe. Besides food, plants in the Fabaceae family can be used to produce natural gums, dyes, and ornamentals.

The Poaceae plant family supplies food, building materials, and feedstock for fuel processing. Taxonomically classified in the Plantae kingdom, Tracheobionta (subkingdom), Spermatophyta (superdivision), Magnoliophyta (division), Liliopsida (class), Commelinidae (subclass), and Cyperales (order), the Poaceae family includes, but is not limited to, flowering plants, grasses, and cereal crops such as barely, corn, lemongrass, millet, oat, rye, rice, wheat, sugarcane, and sorghum. Types of turf grass found in Arizona include, but are not limited to, hybrid Bermuda grasses (e.g., 328 tifgm, 419 tifway, tif sport).

The Vitaceae plant family includes flowering plants and vines. Taxonomically classified in the Plantae kingdom, Tracheobionta (subkingdom), Spermatophyta (superdivision), Magnoliophyta (division), Magnoliopsida (class), Rosidae (subclass), and Rhammales (order), the Vitaceae family includes, but is not limited to, grapes.

The present invention is further illustrated by the following examples that should not be construed as limiting. The contents of all references, patents, and published patent applications cited throughout this application, as well as the Figures, are incorporated herein by reference in their entirety for all purposes.

EXAMPLES

Example 1. Preparation of PHYCOTERRA® ST (Lysed *Chlorella* Microalgae)

Figure 2:
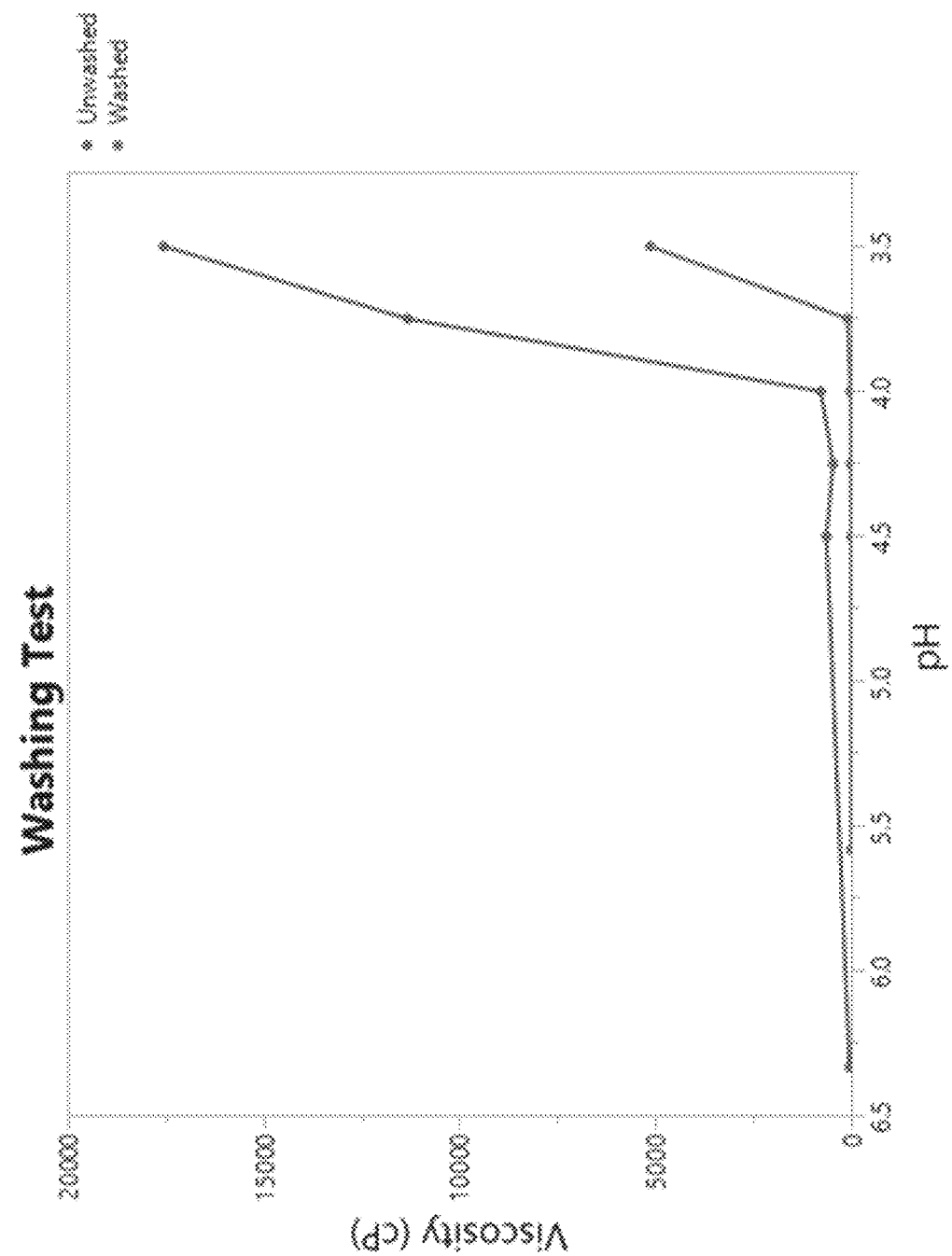
FIG. 2 depicts a significant decrease in viscosity after a washing step with a preparation of PHYCOTERRA® ST (lysed *Chlorella* microalgae).

Preparation of the PHYCOTERRA® ST (lysed *Chlorella* microalgae) followed the general outline provided in WO 2017/218896 A1 (Shinde et al.) entitled "Microalgae-Based Composition, and Methods of its Preparation and Application to Plants" with a few modifications. After harvest of the *Chlorella* microalgae culture, the cells were washed to reduce the viscosity of the resulting product. Previously, production of PHYCOTERRA® ST (lysed *Chlorella* microalgae) without a washing step had resulted in batches with relatively high amounts of viscosity (see FIG. 1). In a comparison of a batch of harvested *Chlorella* cells that were lysed without washing versus those lysed with washing, the washed cells demonstrated a marked decrease in viscosity (see FIG. 2).

Various methods can be used to lyse the *Chlorella* cells including using a bead mill, a shear mill, or a combination of these techniques. In addition, the volumes of aqueous solution used to wash the cells can vary with the volume to volume (v/v) ratio of solution to harvested *Chlorella* cells ranging from 1:1 to 20:1, including any sub-range thereof and v/v ratios of 1:1, 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, and 20:1. Washing of the *Chlorella* cells can be performed before or after pasteurization. Various stabilizers can be added to the lysed *Chlorella* cells including potassium sorbate, phosphoric acid, ascorbic acid, sodium benzoate, or any combination thereof. The final product PHYCOTERRA® ST (lysed *Chlorella* microalgae) has a concentration in the range of 1%-20% solids by weight (e.g., 1%-17.5%, 1%-15%, 1%-12.5%, 1%-10%, 1%-7.5%, 1%-5% solids by weight or about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, or about 20% solids by weight).

Figure 3:
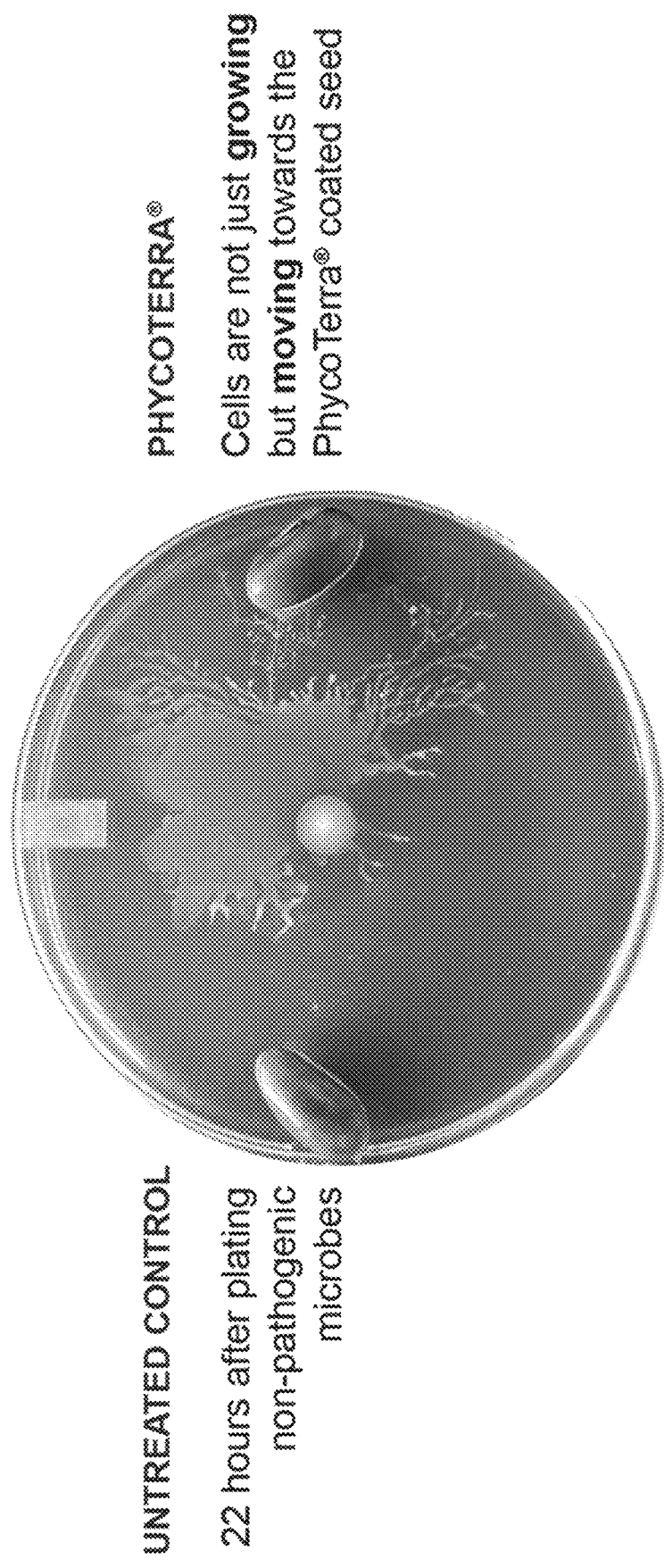
FIG. 3 depicts the growth and movement of non-pathogenic microbes on a soft agar plate (0.5% agar) towards a seed coated with PHYCOTERRA® ST (lysed *Chlorella* microalgae) after 22 hours.

Example 2. Migration of Non-Pathogenic Microbes Towards PHYCOTERRA® ST-Treated Seed A seed treated with PHYCOTERRA® ST (lysed *Chlorella* microalgae) was placed on one side of an agar plate (0.5% agar), and an untreated seed was placed on the opposite side of the agar plate. A non-pathogenic microbial strain, originally isolated from a healthy alfalfa root collected from the fields in Arizona, was inoculated in the center of the plate, and the plate was incubated at room temperature for 22 hours. At the end of the 22-hour incubation, growth and migration of the non-pathogenic microbial strain was determined. As shown in FIG. 3, the non-pathogenic microbial strain grew and migrated towards the seed treated with PHYCOTERRA® ST (lysed *Chlorella* microalgae). Thus, treatment of seed with PHYCOTERRA® ST (lysed *Chlorella* microalgae) can lead to the active recruitment of beneficial soil microbes in proximity to the planted seed.

Example 3. PHYCOTERRA® ST (Lysed *Chlorella* Microalgae) Increases Culturable Bacterial Populations in Various Soil Types Soil samples representing two different soil textures determined by the USDA NRCS Soil Texture Calculator were collected from different regions in the United States: 1) loam soil from Granger, Iowa; and 2) sand soil from Douglas, Ga. The following treatments were applied to each type of soil: conventional PHYCOTERRA® (whole cell *Chlorella* microalgae) and PHYCOTERRA® ST (lysed *Chlorella* microalgae). Culturable bacterial populations were counted 3 days after treatment by preparing a series of 10-fold dilutions of soil samples before applying them to Petri dishes containing an agar-based medium and counting the resulting colonies. Untreated soil samples were also applied to the Petri dishes and counted for comparison.

Figure 4:
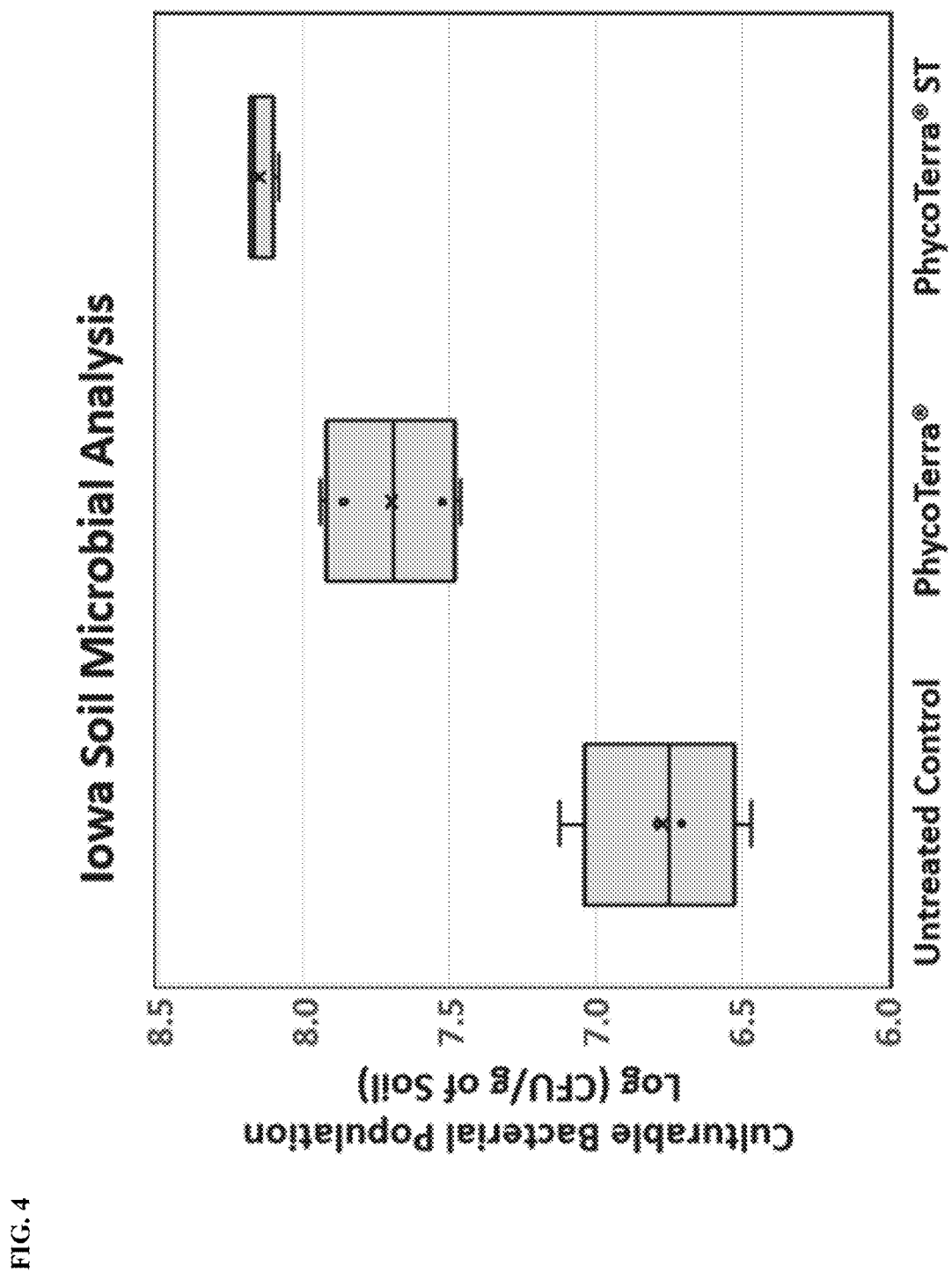
FIG. 4 depicts the culturable bacterial populations obtained after treatment of soil samples (i.e., loam soil) from Granger, Iowa with PHYCOTERRA® (whole cell *Chlorella* microalgae) or PHYCOTERRA® ST (lysed *Chlorella* microalgae) compared to those obtained from the same soil left untreated.
Figure 5:
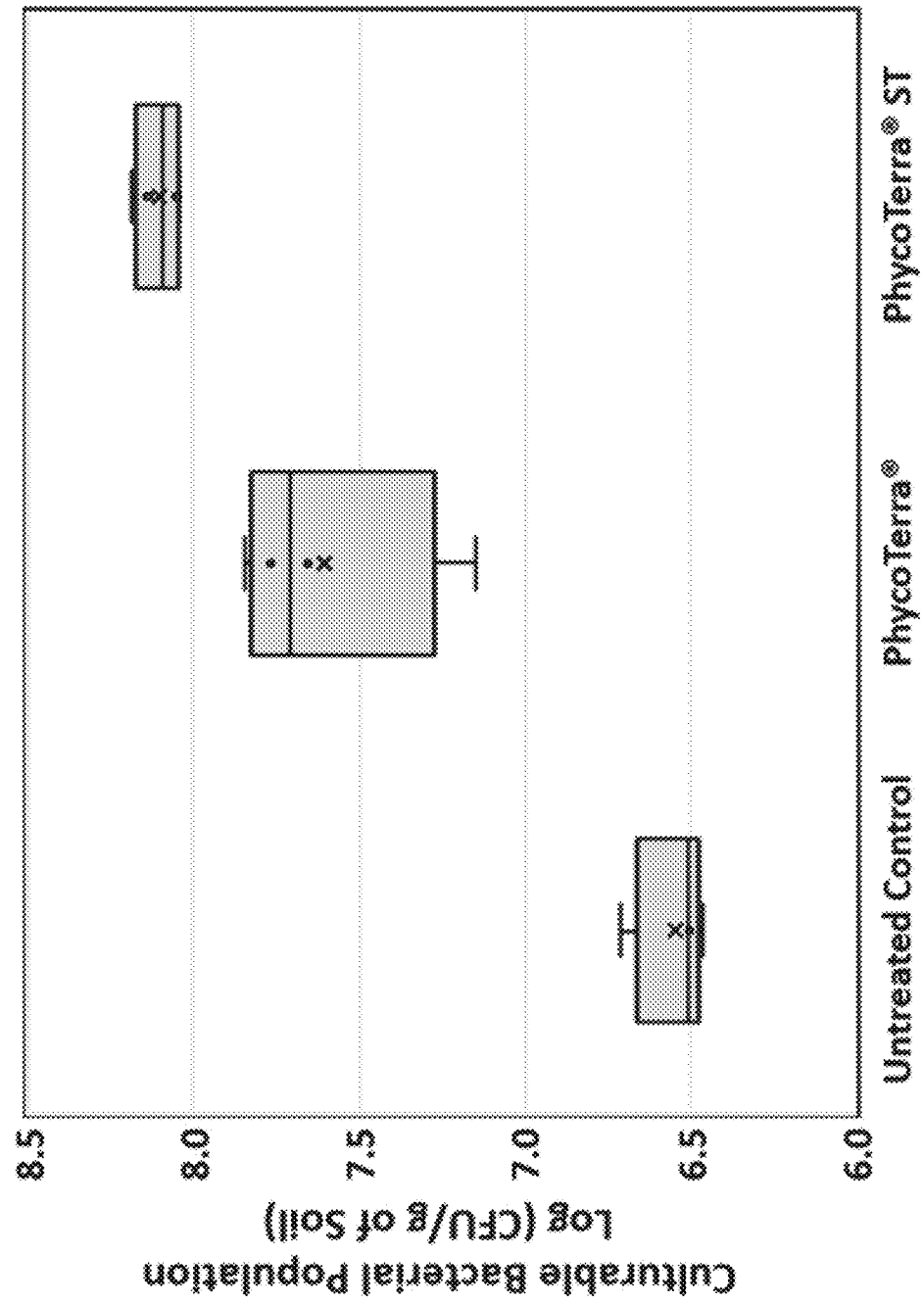
FIG. 5 depicts the culturable bacterial populations obtained after treatment of soil samples (i.e., sand soil) from Douglas, Ga. with PHYCOTERRA® (whole cell *Chlorella* microalgae) or PHYCOTERRA® ST (lysed *Chlorella* microalgae) compared to those obtained from the same soil left untreated.

Both treatments increased the culturable bacterial populations in the soil samples significantly compared to the untreated control soil samples with PHYCOTERRA® ST (lysed *Chlorella* microalgae) having an even greater effect than PHYCOTERRA® (whole cell *Chlorella* microalgae) (see FIGS. 4-5). Without wishing to be bound by any theory, this revitalization of the native microbiome in the soil by PHYCOTERRA® (whole cell *Chlorella* microalgae) and PHYCOTERRA® ST (lysed *Chlorella* microalgae) can contribute to a healthier growth substrate for crops by helping to build soil structure and retain water more efficiently.

Example 4. PHYCOTERRA® ST (Lysed *Chlorella* Microalgae) Increases Total Bacterial Populations As Well As Putative Beneficial Bacterial Species in Various Soil Types Soil samples representing two different soil textures determined by the USDA NRCS Soil Texture Calculator were collected from different regions in the United States: 1) loam soil from Granger, Iowa; and 2) sand soil from Douglas, Ga. The following treatments were applied to each type of soil: conventional PHYCOTERRA® (whole cell *Chlorella* microalgae) and PHYCOTERRA® ST (lysed *Chlorella* microalgae). At 3 days after the application, approximately 1 gram of soil sample was collected and stored at −80° C. for future DNA extraction.

A bacterial community profiling analysis was performed with the treated samples to further investigate the effects of with PHYCOTERRA® (whole cell *Chlorella* microalgae) or PHYCOTERRA® ST (lysed *Chlorella* microalgae) compared to those obtained from the same soil left untreated. Total DNA was extracted from soil samples before subjecting it to PCR to amplify the V3-V4 regions (~430 bp) of the 16S rRNA gene. The resulting amplicons (i.e., amplified partial 16S rRNA gene) were sequenced using a pair-end 2×300 bp Illumina MiSee$^m$ platform. The raw 16S rRNA gene sequences from isolated microbial DNA obtained with the different soil types were processed using QIIME2 version 2020.11 (Bolyen et al., 2019). Briefly, single-end reads were imported into QIIME2 and processed with DEBLUR (Amir et al., 2017) to quality filter, trim reads, correct errors, and remove PCR chimeras to obtain representative operational taxonomic unit (OTU) sequences. DEBLUR clustered the resulting sequences at the 100% similarity cutoff and the consensus taxonomy for each OTU was classified using a Naïve Bayes classifier trained on 16S rRNA gene sequences from the SILVA v132 database (Quast et al., 2013).

Figure 6:
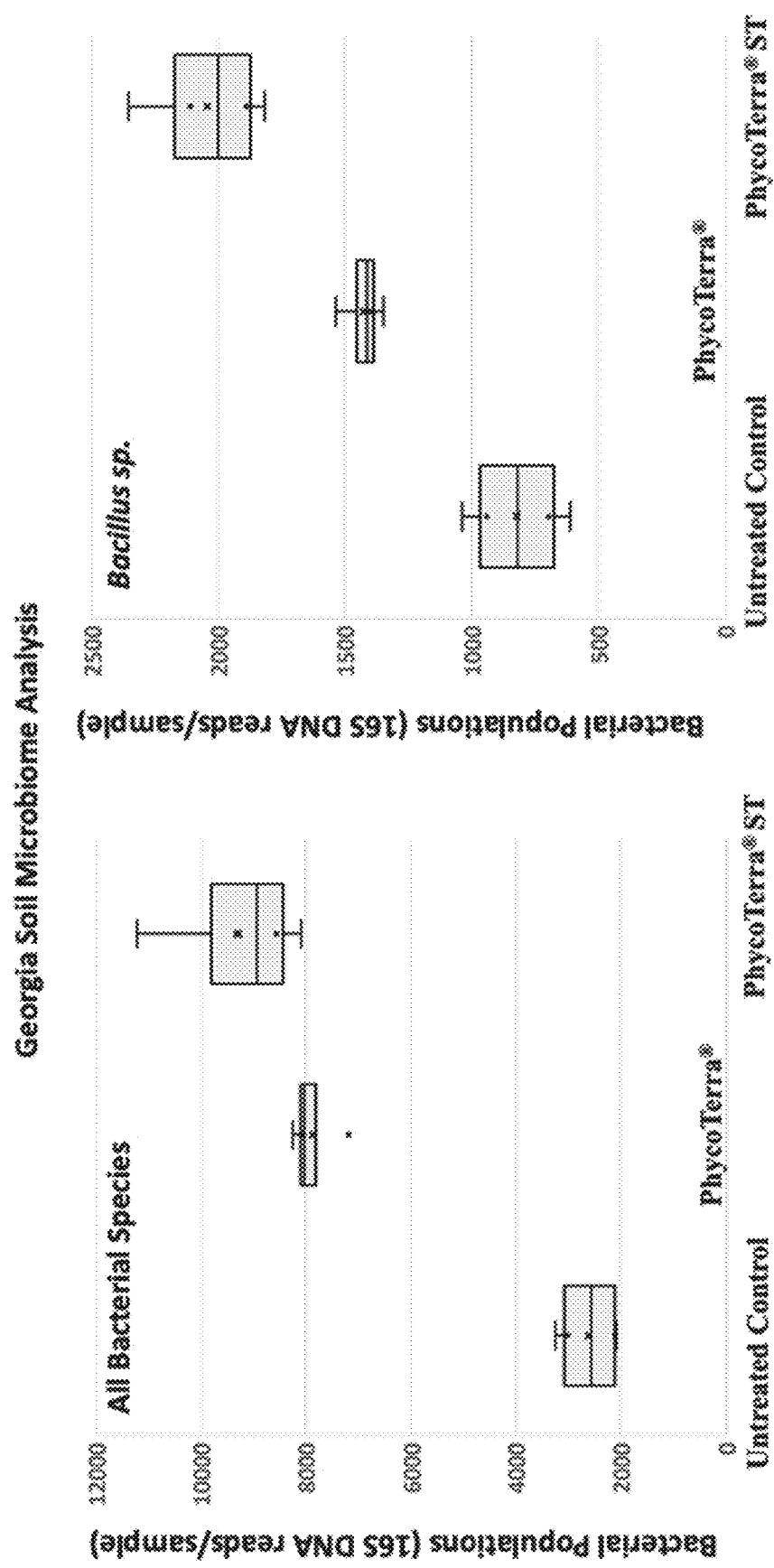
FIG. 6 depicts the total bacterial populations and *Bacillus* sp. populations obtained after treatment of soil samples (i.e., sand soil) from Douglas, Ga. with PHYCOTERRA® (whole cell *Chlorella* microalgae) or PHYCOTERRA® ST (lysed *Chlorella* microalgae) compared to those obtained from the same soil left untreated.
Figure 7:
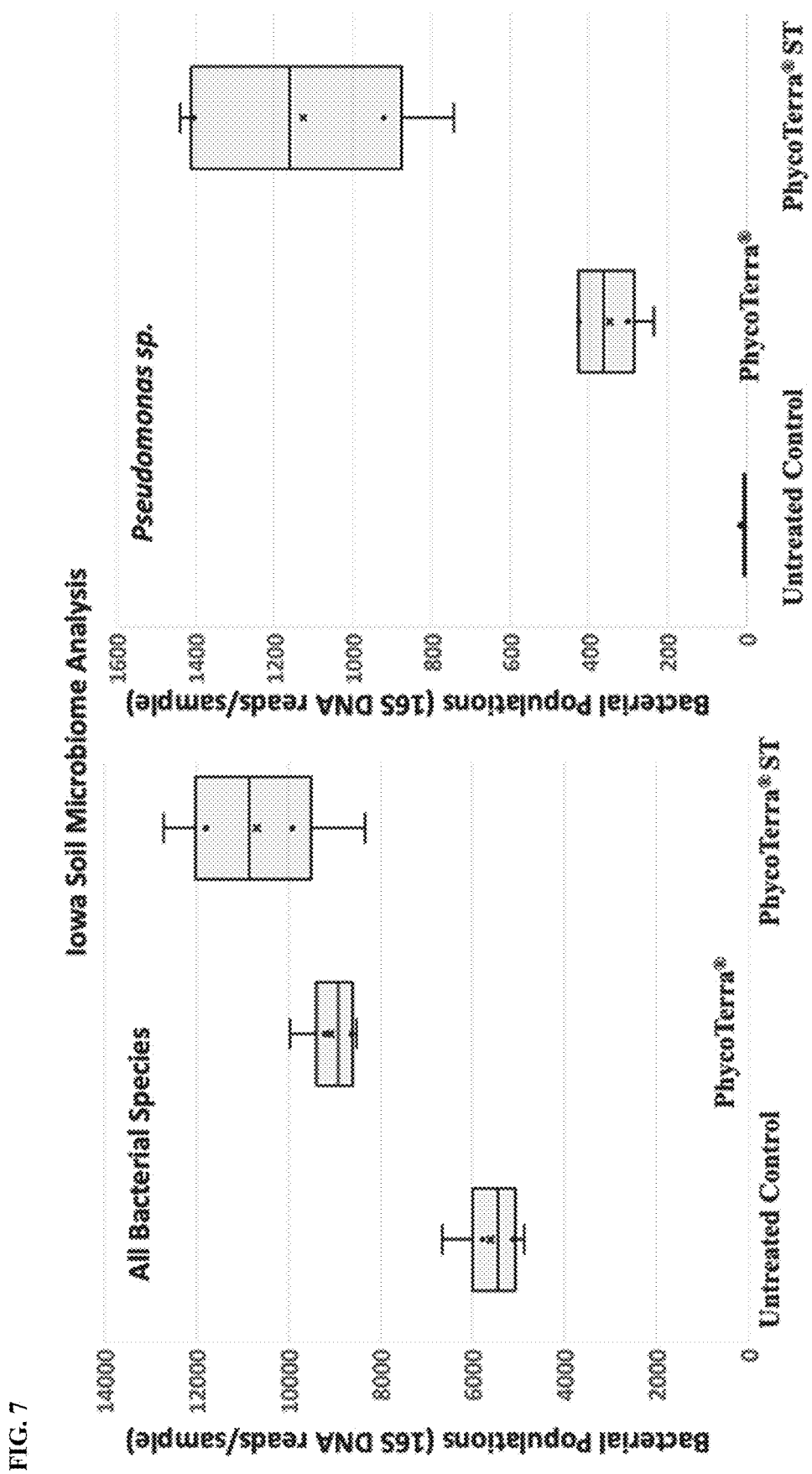
FIG. 7 depicts the total bacterial populations and *Pseudomonas* sp. populations obtained after treatment of soil samples (i.e., loam soil) from Granger, Iowa with PHYCOTERRA® (whole cell *Chlorella* microalgae) or PHYCOTERRA® ST (lysed *Chlorella* microalgae) compared to those obtained from the same soil left untreated

Three days after the application, both treatments increased the total (including both culturable and non-culturable) bacterial populations in the soil samples significantly compared to the untreated control soil samples with PHYCOTERRA® ST (lysed *Chlorella* microalgae) having an even greater effect than PHYCOTERRA® (whole cell *Chlorella* microalgae) (see FIGS. 6-7). In Georgia soil, the treatment with PHYCOTERRA® ST (lysed *Chlorella* microalgae) have a greater impact than PHYCOTERRA® (whole cell *Chlorella* microalgae) in increasing the population of a bacterial species belonging to *Bacillus*, whereas in Iowa soil the treatment with PHYCOTERRA® ST (lysed *Chlorella* microalgae) significantly increased a bacterial species belonging to *Pseudomonas*. These bacterial species are generally known as beneficial soil bacteria with many representative species capable of stimulating plant growth. Therefore, it is advantageous to apply PHYCOTERRA® ST (lysed *Chlorella* microalgae) and PHYCOTERRA® (whole cell *Chlorella* microalgae) to stimulate beneficial soil microbial populations.

Example 5. PHYCOTERRA® ST (Lysed *Chlorella* Microalgae) Increases Corn Shoot Biomass PHYCOTERRA® ST (lysed *Chlorella* microalgae) was applied as a seed coating to corn seed at a rate of 4 ounces per hundredweight (oz/cwt). For comparison, PHYCOTERRA® (whole cell *Chlorella* microalgae) was applied at seeding as an in-furrow application at a rate of 1 quart/acre. The PHYCOTERRA® ST (lysed *Chlorella* microalgae) was applied at a concentration of about 10.5% solids by weight. Untreated control seed were planted together with the treated corn seed in a greenhouse. Harvest occurred 39 days after seeding when all plants were at the V-9 stage of growth.

Figure 8:
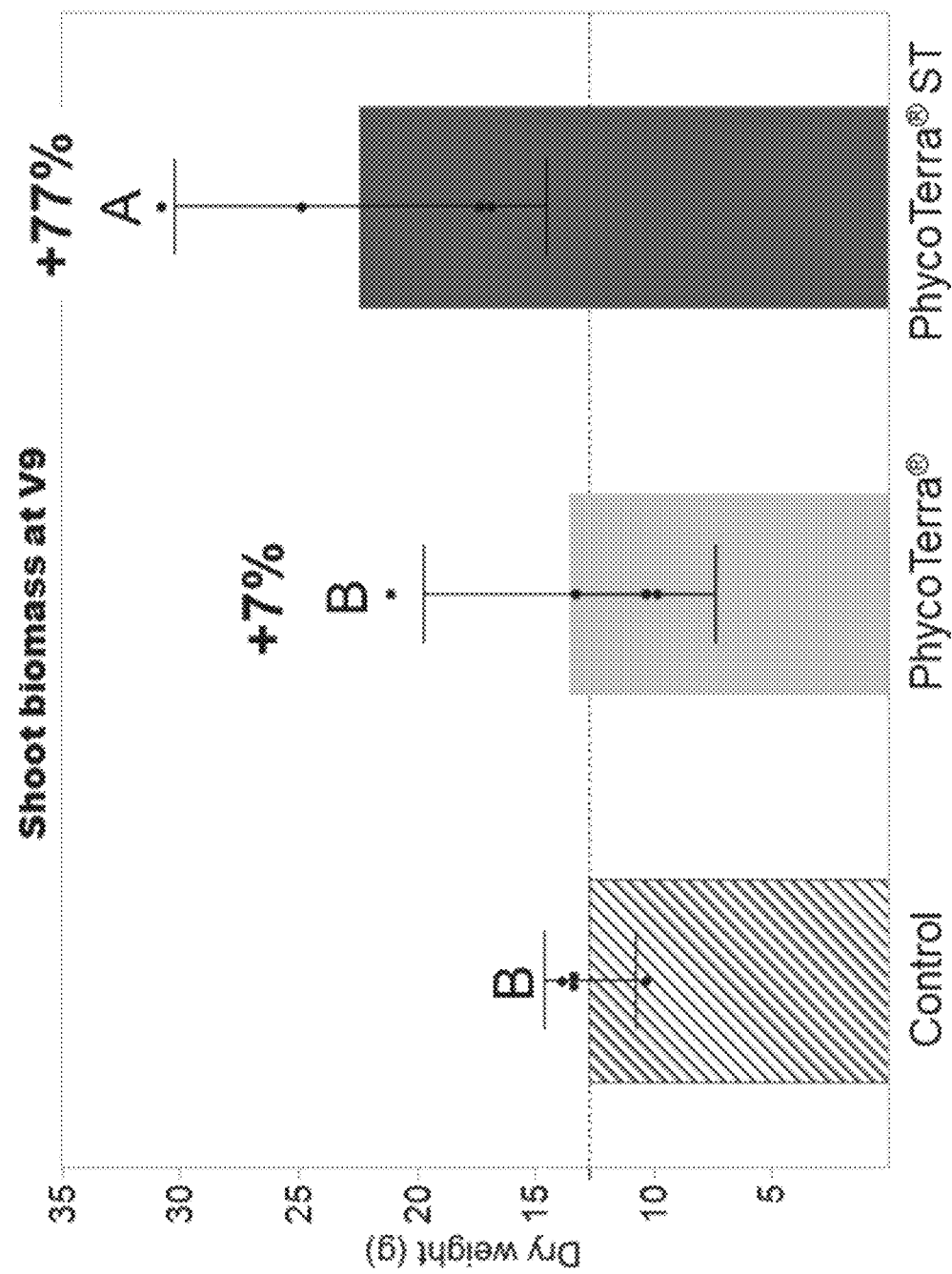
FIG. 8 depicts the shoot biomass of corn plants without treatment ("Control"), with an in-furrow treatment of PHYCOTERRA® (whole cell *Chlorella* microalgae), or with a seed treatment of PHYCOTERRA® ST (lysed *Chlorella* microalgae). Differences in letters above each bar indicate a statistical difference in comparison to control (p=0.0979).

The average dry shoot weights were determined for the treated and untreated plants. A statistical analysis of LSMean Dunnet, p<0.1, was applied to determine the statistical significance of any differences observed. Surprisingly, PHYCOTERRA® ST-treated plants demonstrated a statistically significant 77% increase in dry shoot weight compared to untreated plants whereas PHYCOTERRA®-treated plants experienced a 7% increase in dry shoot weight (see FIG. 8).

Figure 9:
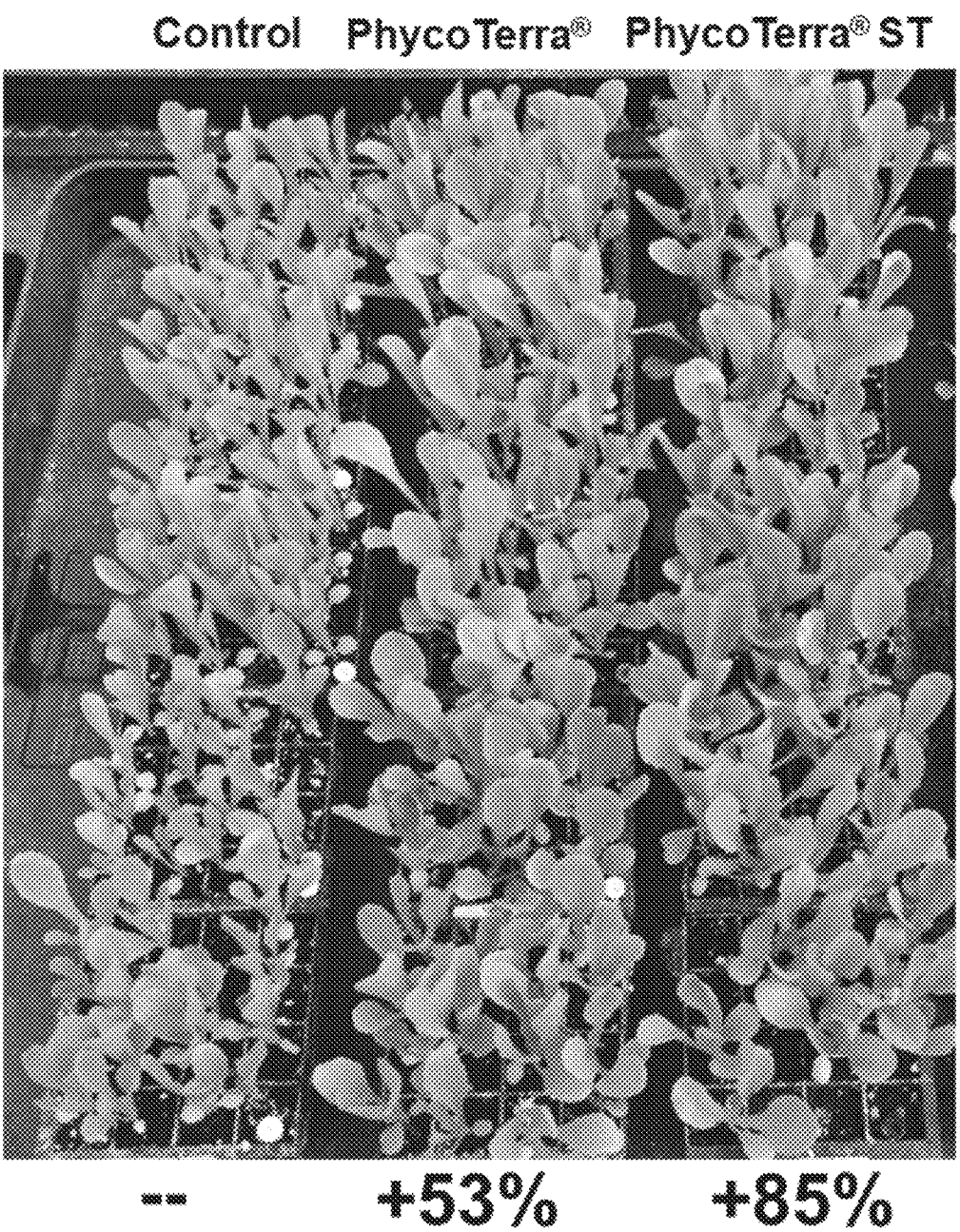
FIG. 9 depicts a photograph of representative lettuce plants left untreated ("Control"), treated with a drenching application of PHYCOTERRA® (whole cell *Chlorella* microalgae), or treated with a drenching application of PHYCOTERRA® ST (lysed *Chlorella* microalgae). Average increases in shoot biomass compared to control plants are shown below the photograph.

Example 6. PHYCOTERRA® ST (Lysed *Chlorella* Microalgae) Increases Lettuce Shoot Biomass PHYCOTERRA® ST (lysed *Chlorella* microalgae) and PHYCOTERRA® (whole cell *Chlorella* microalgae) were applied as drenches to Romaine lettuce (Valley Heart variety) plants at a concentration of 5% (v/v) at seeding. Control Romaine lettuce (Valley Heart variety) plants were also seeded and grown without treatment for comparison. All lettuce plants were grown for 25 days in a greenhouse and afterwards evaluated for shoot biomasses. Surprisingly, PHYCOTERRA® ST-treated plants demonstrated an 85% increase in average shoot biomass compared to untreated plants whereas PHYCOTERRA®-treated plants experienced a 53% increase in average shoot biomass (see FIG. 9).

Figure 10:
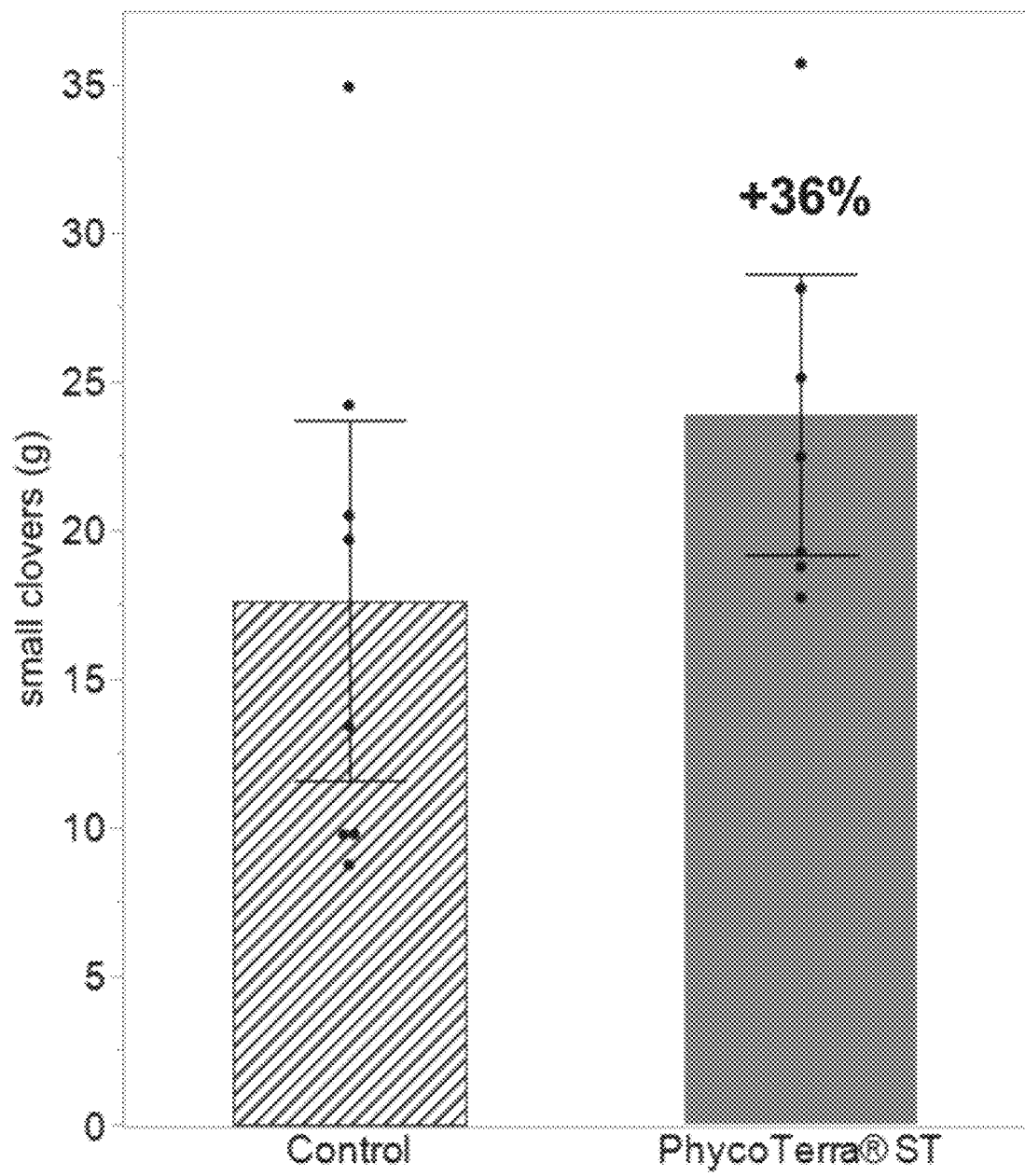
FIG. 10 depicts the shoot biomasses of a clover cover crop without treatment ("Control") or with a seed treatment of PHYCOTERRA® ST (lysed *Chlorella* microalgae).
Figure 11:
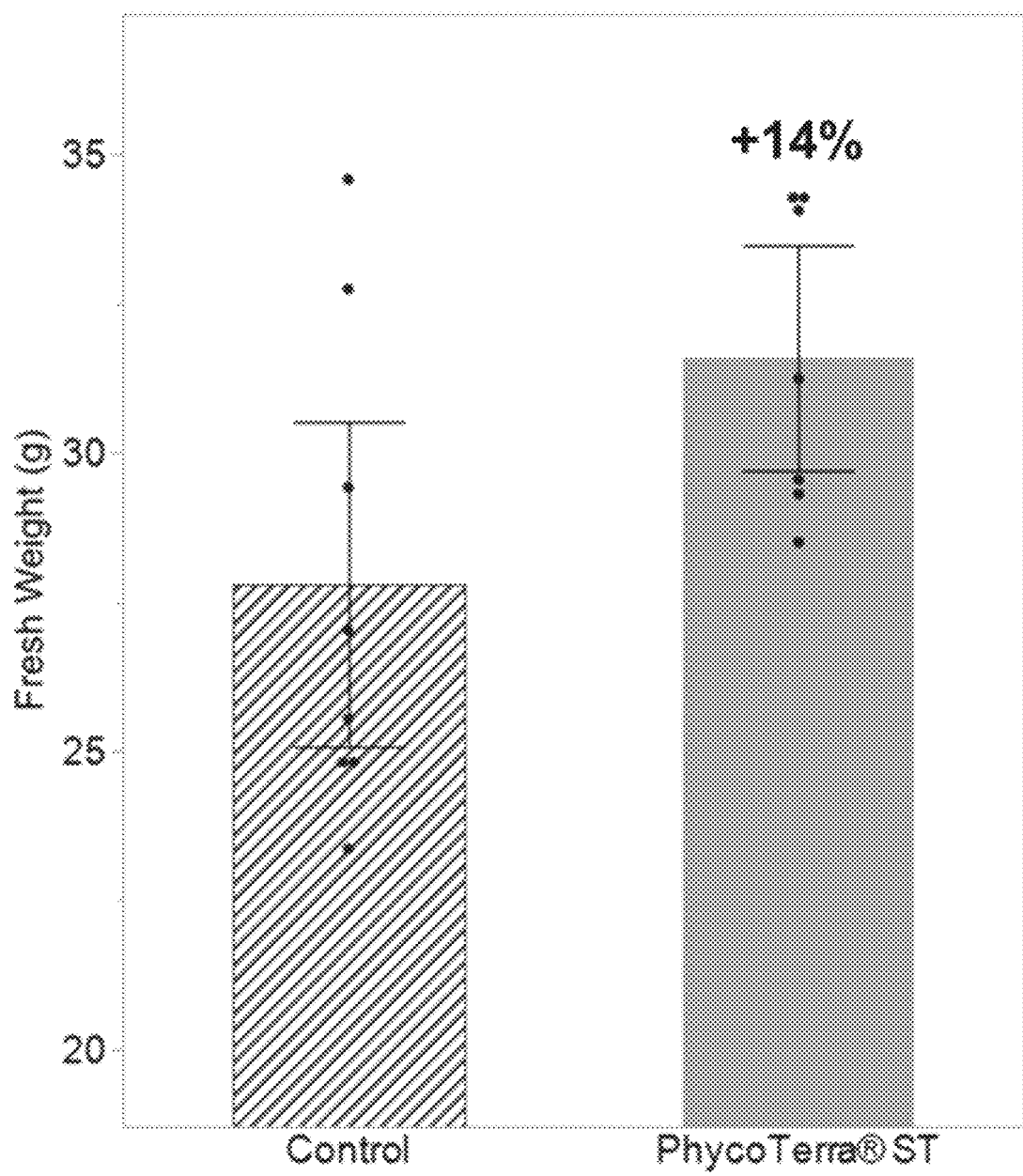
FIG. 11 depicts the shoot biomasses of a cereal rye cover crop without treatment ("Control") or with a seed treatment of PHYCOTERRA® ST (lysed *Chlorella* microalgae).

Example 7. PHYCOTERRA® ST (Lysed *Chlorella* Microalgae) Increases the Shoot Biomasses of a Clover Cover Crop and a Cereal Rye Cover Crop PHYCOTERRA® ST (lysed *Chlorella* microalgae) was applied as a seed coating at 4 oz/cwt to cover crops consisting of clover or cereal rye. Control clover and cereal rye plants were seeded and grown without treatment for comparison. All plants were grown for 20 days in a greenhouse and afterwards evaluated for shoot biomasses. PHYCOTERRA® ST-treated clover demonstrated a 36% increase in average shoot biomass compared to untreated plants, and PHYCOTERRA® ST-treated cereal rye demonstrated a 14% increase in average shoot biomass compared to untreated plants (see FIGS. 10 and 11). A statistical analysis of LSMean Dunnet, p<0.1, was applied to determine the statistical significance of any differences observed. This analysis indicated that the differences observed with the clover cover crop were statistically significant while the differences observed with the cereal rye cover crop had a p-value of 0.1527.

Example 8. PHYCOTERRA® ST (Lysed *Chlorella* Microalgae) Wheat Field Trials

Figure 12:
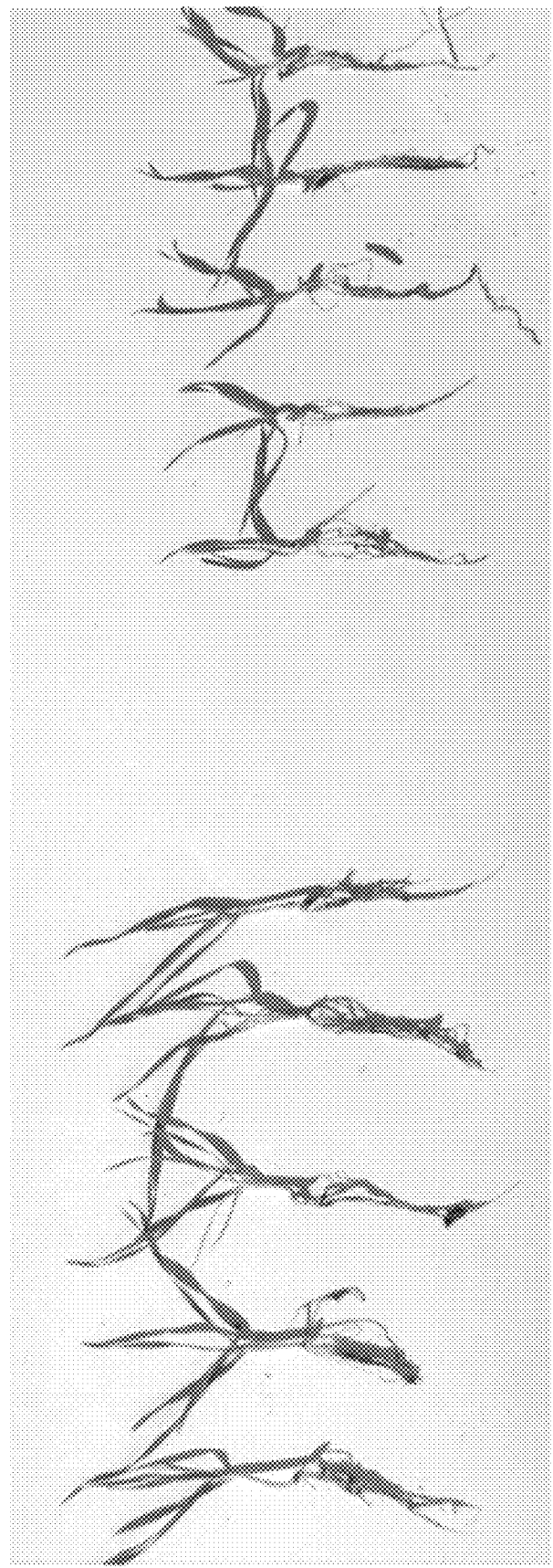
FIG. 12 depicts photographs of representative wheat plants after treatment with a standard fungicide and insecticide alone or in combination with PHYCOTERRA® ST (lysed *Chlorella* microalgae).

Several independent field trials were conducted in various locations throughout the state of North Carolina. In one field trial conducted in Hertford, N.C., CROPLAN® 9606 Brand Wheat (Variety 112371W) was treated with a standard combination of fertilizer and insecticide alone or in combination with PHYCOTERRA® ST (lysed *Chlorella* microalgae) at an application rate of 5 oz/cwt. The soil in this location was a combination of Nimmo loamy fine sand and Arapahoe fine sandy loam. The resulting wheat seedlings were evaluated for overall growth. The photograph in FIG. 12 shows enhanced shoot growth and root growth in the seedlings treated with PHYCOTERRA® ST (lysed *Chlorella* microalgae) compared to those seedlings receiving only the fungicide and insecticide.

Figure 13:
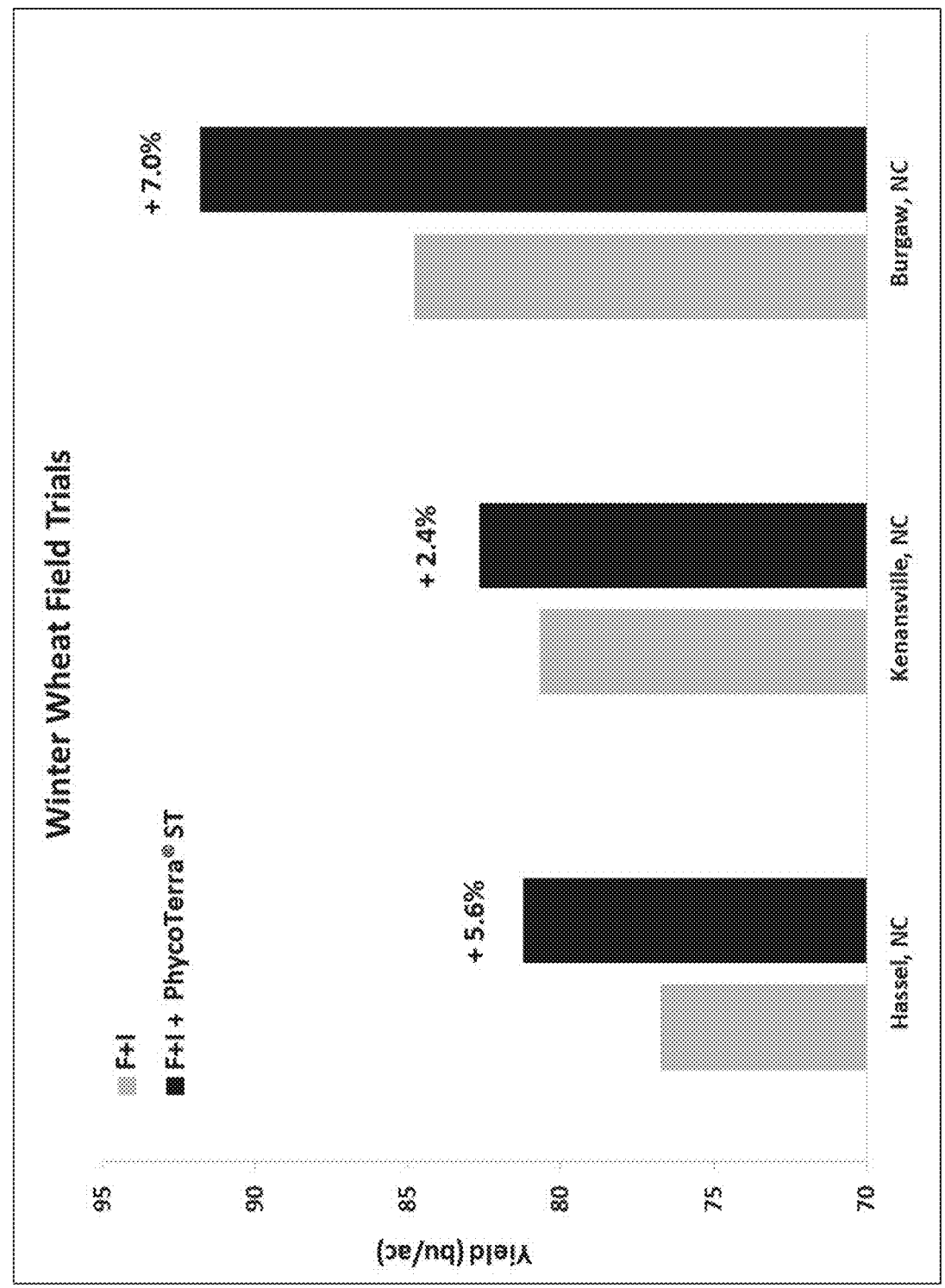
FIG. 13 depicts the average yield in bushels per acre across three field trials in Hassel, N.C.; Kenansville, N.C.; and Burgaw, N.C. with wheat treated with a standard fungicide and insecticide alone or in combination with PHYCOTERRA® ST (lysed *Chlorella* microalgae).

In field trials conducted in Hassel, N.C.; Kenansville, N.C.; and Burgaw, N.C., final yields were determined with wheat treated with a standard combination of fertilizer and insecticide alone or in combination with PHYCOTERRA® ST (lysed *Chlorella* microalgae) at an application rate of 5 oz/cwt. The soil at each location was a sandy loam soil. Application of PHYCOTERRA® ST (lysed *Chlorella* microalgae) consistently resulted in an increased yield averaging+5% over the wheat treated with only the fungicide and insecticide (see FIG. 13).

Example 9. PHYCOTERRA® ST (Lysed *Chlorella* Microalgae) in Combination with PHYCOTERRA® (Whole Cell *Chlorella* Microalgae) Produces a Synergistic Effect in Corn The advanced plant growth enhancement activity of the algal composition combinations is evident from the example below. While each individual algal composition exhibits efficacy in enhancing plant growth, the combination has an activity which exceeds a simple addition of activities.

PHYCOTERRA® ST (lysed *Chlorella* microalgae) was applied as a seed coating to corn seeds at a rate of 4 oz/cwt. PHYCOTERRA® (whole cell *Chlorella* microalgae) was subsequently applied at seeding at a rate of 1 quart per acre (qt/ac). Untreated control plants were compared to plants treated with PHYCOTERRA® ST (lysed *Chlorella* microalgae) alone, PHYCOTERRA® (whole cell *Chlorella* microalgae) alone, and a combination of the two treatments. Harvest occurred 39 days after seeding when all plants were at the V-9 stage of growth in the greenhouse. The average dry shoot weights were determined for the treated and untreated plants.

A synergistic effect is present when the plant growth enhancement activity of the algal composition combination exceeds the total of the activities of the algal compositions when applied individually. The expected activity for a given combination of two plant growth enhancement agents can be calculated as follows (cf. Colby, S. R., "Calculating Synergistic and Antagonistic Responses of Herbicide Combinations," *Weeds*, 1967, 15, 20-22):

If
X is the plant growth enhancement activity when agent A is applied at an application rate of m gallons/acre (or liters/hectare),
Y is the plant growth enhancement activity when agent B is applied at an application rate of n gallons/acre (or liters/hectare),
E is the plant growth enhancement activity when the active compounds A and B are applied at application rates of m and n gallons/acre (or liters/hectare), respectively,
Then $$E = X + Y - \frac{X \cdot Y}{100}$$

The degree of plant growth enhancement activity compared to untreated control, expressed in %, is denoted. 0% means plant growth which corresponds to that of the untreated control while an activity of 100% means that the plant growth is twice that observed with the untreated control.

If the actual plant growth enhancement activity exceeds the calculated value, then the activity of the combination is super additive, i.e., a synergistic effect exists. In this case, the efficacy which was actually observed must be greater than the value for the expected efficacy (E) calculated from the above-mentioned formula.

Figure 14:
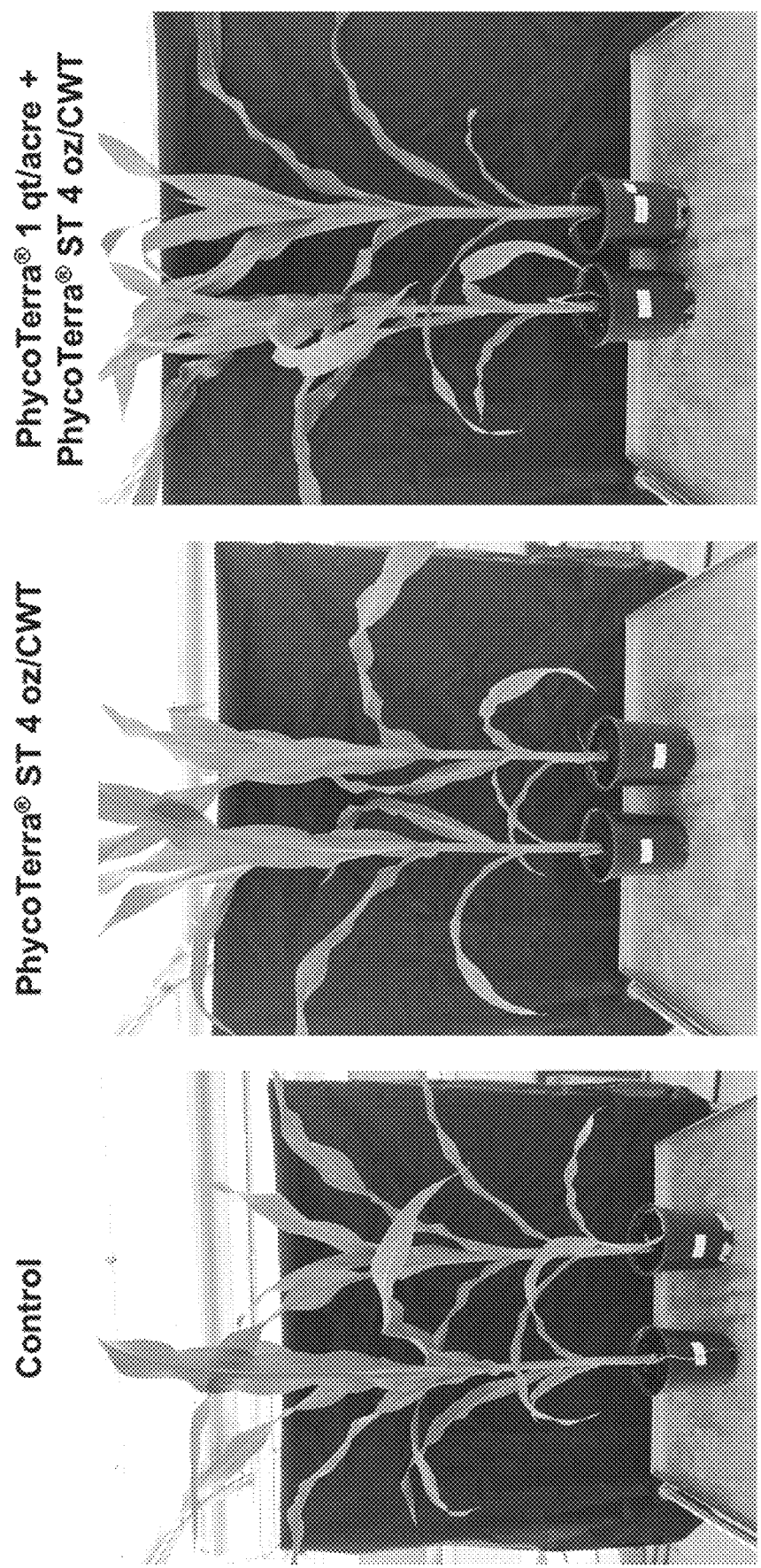
FIG. 14 depicts photographs of corn plant shoots without treatment ("Control"), with a treatment of PHYCOTERRA® ST (lysed *Chlorella* microalgae) applied to seeds, or with a combination treatment of PHYCOTERRA® ST (lysed *Chlorella* microalgae) applied to seeds and PHYCOTERRA® (whole cell *Chlorella* microalgae) applied as a soil drench. The corn plants shown are at V-9 stage of growth.
Figure 15:
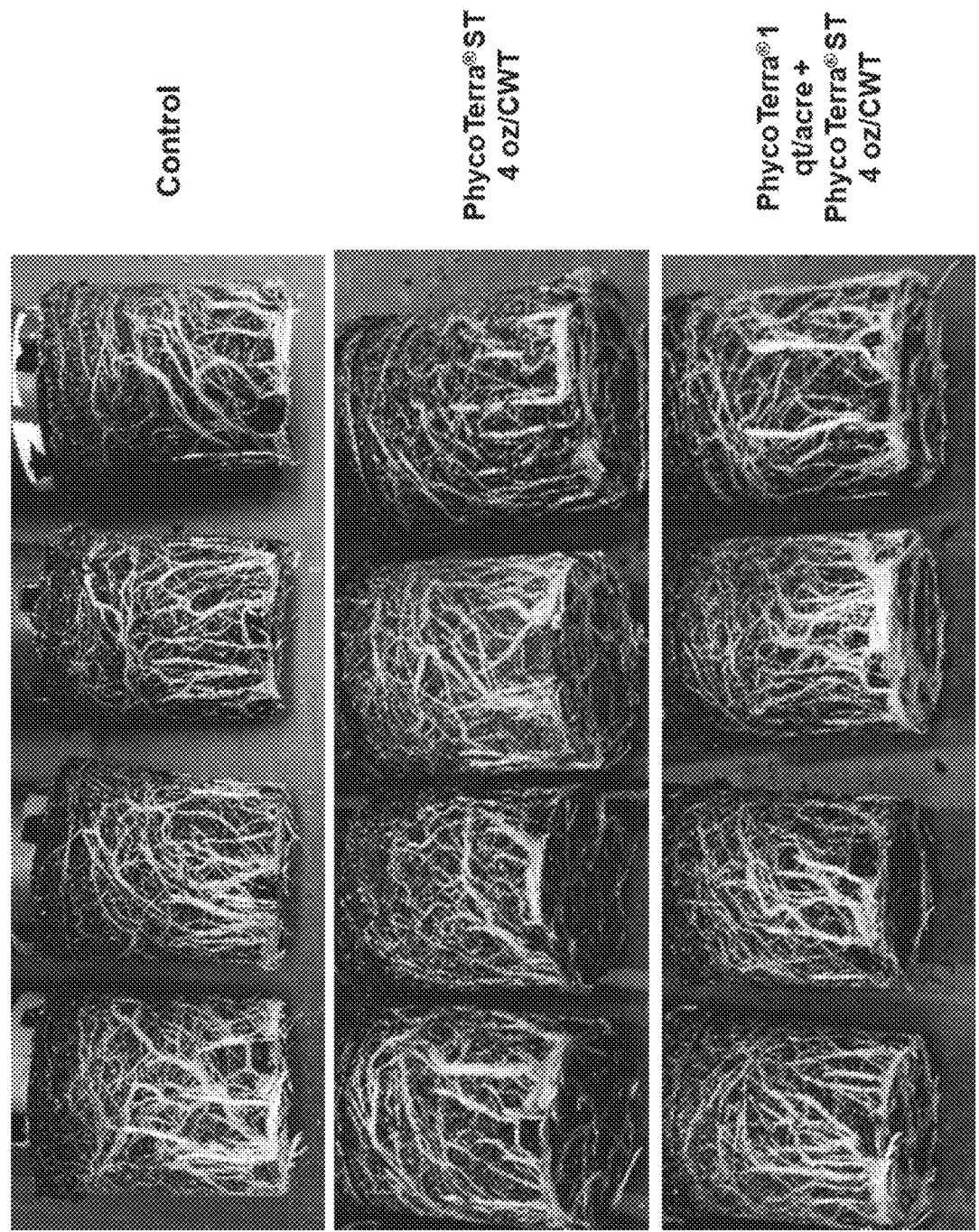
FIG. 15 depicts photographs of corn plant roots without treatment ("Control"), with a treatment of PHYCOTERRA® ST (lysed *Chlorella* microalgae) applied to seeds, or with a combination treatment of PHYCOTERRA® ST (lysed *Chlorella* microalgae) applied to seeds and PHYCOTERRA® (whole cell *Chlorella* microalgae) applied as a soil drench. The corn plants shown are at V-9 stage of growth.

The results shown in Table 1 clearly indicate a synergistic effect resulting from the combination treatment of plants with PHYCOTERRA® ST (lysed *Chlorella* microalgae) and PHYCOTERRA® (whole cell *Chlorella* microalgae). Photographs of the shoots and roots comparing untreated plants to plants treated with the combination of the two products confirmed a striking increase in both shoot and root growth (see FIGS. 14 and 15).

TABLE 1

Measurement of average plant growth enhancement.

| Algal Composition(s) | Application Rate(s) | Activity in % Found* | Calc.** |
|---|---|---|---|
| Untreated Control | — | 0 | — |
| PHYCOTERRA® | 1 qt/ac | 7 | — |
| PHYCOTERRA® ST | 4 oz/cwt | 77 | — |
| PHYCOTERRA® + PHYCOTERRA® ST | 1 qt/ac 4 oz/cwt | 103 | 79 |

*Found = activity observed
**Calc. = activity calculated using Colby's formula

Example 10. PHYCOTERRA® ST (Lysed *Chlorella* Microalgae) in Combination with PHYCOTERRA® (Whole Cell *Chlorella* Microalgae) Produces a Synergistic Effect in Potatoes PHYCOTERRA® ST (lysed *Chlorella* microalgae) was applied as a seed coating to seed potatoes at a rate of 8.3 fluid ounces per hundredweight (fl oz/cwt). PHYCOTERRA® (whole cell *Chlorella* microalgae) was subsequently applied at a rate of 4.25 qt/acre by sprayer boom over row ridges. The potatoes used were of the Brooke variety, and the trial occurred in fields containing sandy loam soil having 2.7% organic matter. Untreated control plants were compared to plants treated with PHYCOTERRA® ST (lysed *Chlorella* microalgae) alone, PHYCOTERRA® (whole cell *Chlorella* microalgae) alone, and a combination of the two treatments.

At harvest, the marketable yield was determined for each group as hundredweight per acre. The marketable yield values for each group were compared and reported in terms of a percentage relative to the untreated control group with 0% indicating no increase in marketable yield over the untreated control group and 100% indicating a marketable yield twice that of the untreated control group. Analysis of the results with the Colby formula indicates a synergistic effect resulting from the combination treatment of plants with PHYCOTERRA® ST (lysed *Chlorella* microalgae) and PHYCOTERRA® (whole cell *Chlorella* microalgae) (see Table 2).

TABLE 2

Measurement of marketable yield enhancement.

| Algal Composition(s) | Application Rate(s) | Activity in % Found* | Cale.** |
|---|---|---|---|
| Untreated Control | — | 0 | — |
| PHYCOTERRA® | 4.25 qt/ac | 0 | — |
| PHYCOTERRA® ST | 8.3 fl oz/cwt | 5 | — |
| PHYCOTERRA® + PHYCOTERRA® ST | 4.25 qt/ac 8.3 fl oz/cwt | 12 | 5 |

*Found = activity observed
**Calc. = activity calculated using Colby's formula

Example 11. PHYCOTERRA® FX (Lysed *Chlorella* Microalgae) in Combination with PHYCOTERRA® (Whole Cell *Chlorella* Microalgae) Produces a Synergistic Effect in Lettuce Synergistic Effect on Shoot Growth PHYCOTERRA® FX (lysed *Chlorella* microalgae) was applied as a drench to lettuce plants at seeding at a rate of 1 qt/acre. PHYCOTERRA® (whole cell *Chlorella* microalgae) was also applied as a drench at seeding at a rate of 1 quart per acre (qt/ac). Untreated control plants were compared to plants treated with PHYCOTERRA® FX (lysed *Chlorella* microalgae) alone, PHYCOTERRA® (whole cell *Chlorella* microalgae) alone, and a combination of the two treatments.

The average shoot weights of each group of lettuce plants were determined several weeks later with treated groups compared and reported in terms of a percentage relative to the untreated control group with 0% indicating no increase in average shoot weight over the untreated control group and 100% indicating an average shoot weight twice that of the untreated control group. Analysis of the results with the Colby formula indicates a synergistic effect resulting from the combination treatment of plants with PHYCOTERRA® FX (lysed *Chlorella* microalgae) and PHYCOTERRA® (whole cell *Chlorella* microalgae) (see Table 3).

TABLE 3

Measurement of shoot growth enhancement.

| Algal Composition(s) | Application Rate(s) | Activity in % Found* | Cale.** |
|---|---|---|---|
| Untreated Control | — | 0 | — |
| PHYCOTERRA® | 1 qt/ac | 0 | — |
| PHYCOTERRA® FX | 1 qt/ac | 9 | — |
| PHYCOTERRA® + PHYCOTERRA® FX | 1 qt/ac 1 qt/ac | 11 | 9 |

*Found = activity observed
**Calc. = activity calculated using Colby's formula

Synergistic Effect on Chlorophyll Content

The experiment was repeated as outlined above except that PHYCOTERRA® FX (lysed *Chlorella* microalgae) was applied as a foliar treatment to the lettuce plants at a rate of 1 qt/acre three days after the PHYCOTERRA® (whole cell *Chlorella* microalgae) was applied as a drench. Several days after both treatments were complete, the average chlorophyll content of each group of lettuce plants was determined in SPAD units with treated groups compared and reported in terms of a percentage relative to the untreated control group with 0% indicating no increase in chlorophyll weight over the untreated control group and 100% indicating a chlorophyll content twice that of the untreated control group. Analysis of the results with the Colby formula indicates a synergistic effect resulting from the combination treatment of plants with PHYCOTERRA® FX (lysed *Chlorella* microalgae) and PHYCOTERRA® (whole cell *Chlorella* microalgae) (see Table 4).

TABLE 4

Measurement of chlorophyll content enhancement.

| Algal Composition(s) | Application Rate(s) | Activity in % Found* | Cale.** |
|---|---|---|---|
| Untreated Control | — | 0 | — |
| PHYCOTERRA® | 1 qt/ac | 0 | — |
| PHYCOTERRA® FX | 1 qt/ac | 0 | — |
| PHYCOTERRA® + PHYCOTERRA® FX | 1 qt/ac 1 qt/ac | 3 | 0 |

*Found = activity observed
**Calc. = activity calculated using Colby's formula

Unless defined otherwise, all technical and scientific terms herein have the same meaning as commonly understood by one of ordinary skill in the art to which this invention belongs. Although any methods and materials, similar or equivalent to those described herein, can be used in the practice or testing of the present invention, the preferred methods and materials are described herein. All publications, patents, and patent publications cited are incorporated by reference herein in their entirety for all purposes.

The publications discussed herein are provided solely for their disclosure prior to the filing date of the present application. Nothing herein is to be construed as an admission that the present invention is not entitled to antedate such publication by virtue of prior invention.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

REFERENCES

Amir A, McDonald D, Navas-Molina J A, Kopylova E, Morton J T, Zech Xu Z, Kightley E P, Thompson L R, Hyde E R, Gonzalez A, Knight R. 2017. Deblur rapidly resolves single-nucleotide community sequence patterns. mSystems 2:e00191-16.

Bolyen, E., Rideout, J. R., Dillon, M. R. et al. Reproducible, interactive, scalable and extensible microbiome data science using QIIME 2. Nat Biotechnol 37, 852-857 (2019).

Quast, C., E. Pruesse, P. Yilmaz, J. Gerken, T. Schweer, P. Yarza, J. Peplies and F. O. Glockner (2013). "The SILVA ribosomal RNA gene database project: improved data processing and web-based tools." Nucleic Acids Research 41(Database issue): D590-D596.

What is claimed is:

1. A method of enhancing plant growth or chlorophyll content of a plant, the method comprising:
   a) applying an effective amount of a first liquid composition to a locus surrounding the plant, said first liquid composition comprising a culture of microalgae, the microalgae comprising whole pasteurized *Chlorella* cells; and
   b) applying an effective amount of a second liquid composition to a part or propagation material of the plant, said second liquid composition comprising a culture of microalgae, the microalgae comprising lysed pasteurized *Chlorella* cells,
   wherein application of the first liquid composition to the locus surrounding the plant in combination with application of the second liquid composition to the part or propagation material of the plant produces synergistic enhancement of at least one characteristic of the plant.

2. The method of claim 1, wherein the second liquid composition is applied as a foliar treatment.

3. The method of claim 1, wherein the second liquid composition is applied as a seed treatment.

4. The method of claim 1, wherein the whole pasteurized *Chlorella* cells and/or the lysed pasteurized *Chlorella* cells are pasteurized at a temperature ranging from 50° C. to 90° C.

5. The method of claim 1, wherein the lysed pasteurized *Chlorella* cells are lysed with a bead mill, a shear mill, a pulsed electron field (PEF), high pressure homogenization, an enzyme, a chemical solvent, or a combination thereof.

6. The method of claim 1, wherein the first liquid composition and/or the second liquid composition further comprise at least one culture stabilizer selected from the group consisting of potassium sorbate, phosphoric acid, ascorbic acid, sodium benzoate, and any combination thereof.

7. The method of claim 1, wherein the first liquid composition is applied as a soil drench or in-furrow treatment.

8. The method of claim 1, wherein the plant is a corn plant.

9. The method of claim 1, wherein the plant is a potato plant.

10. The method of claim 1, wherein the plant is a lettuce plant.

11. The method of claim 1, wherein the at least one characteristic is selected from the group consisting of shoot growth, root growth, marketable yield, and chlorophyll content.

* * * * *